(12) United States Patent
Tokuchi

(10) Patent No.: US 11,990,107 B2
(45) Date of Patent: May 21, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 446 days.

(21) Appl. No.: 17/164,960

(22) Filed: Feb. 2, 2021

(65) Prior Publication Data
US 2022/0036859 A1 Feb. 3, 2022

(30) Foreign Application Priority Data

Jul. 30, 2020 (JP) .................................. 2020-129712

(51) Int. Cl.
*G09G 5/14* (2006.01)
*G06F 3/048* (2013.01)
(Continued)

(52) U.S. Cl.
CPC ............... *G09G 5/14* (2013.01); *G09G 3/035* (2020.08); *G09G 5/38* (2013.01); *G06F 3/0483* (2013.01); *G06F 3/0485* (2013.01); *G09G 2320/0606* (2013.01); *G09G 2320/0613* (2013.01); *G09G 2340/0464* (2013.01); *G09G 2354/00* (2013.01)

(58) Field of Classification Search
CPC .. G09G 5/10; G09G 5/14; G09G 5/38; G09G 5/003; G09G 3/035; G09G 3/30; G09G 2320/0606; G09G 2320/0613; G09G 2340/0464; G09G 2340/04; G09G 2354/00; G06F 3/0482–0485; G06F 3/04886;
(Continued)

(56) References Cited

U.S. PATENT DOCUMENTS

2011/0227822 A1* 9/2011 Shai ...................... G06F 1/1656
345/156
2014/0055375 A1* 2/2014 Kim ...................... G06F 1/1652
345/173
(Continued)

FOREIGN PATENT DOCUMENTS

JP H06-19663 A 1/1994
JP 2013-114612 A 6/2013
(Continued)

OTHER PUBLICATIONS

Park, Jihun et al., Research on flexible display at Ulsan National Institute of Science and Technology, 2017, Nature Publishing Group, vol. 1 (1), p. 1-13, Article 9 (Year: 2017).*
(Continued)

Primary Examiner — Wesner Sajous
(74) Attorney, Agent, or Firm — Oliff PLC

(57) ABSTRACT

An information processing apparatus includes a processor configured to, in response to dividing an area of a display surface of a deformable display into multiple areas with a folded portion located as a boundary between the multiple areas as a result of deformation of the deformable display, decide layout of multiple images to be displayed in the area of the display surface. The layout is decided on a basis of information regarding each of the multiple images.

11 Claims, 20 Drawing Sheets

(51) Int. Cl.
    *G09G 3/00*           (2006.01)
    *G09G 3/30*           (2006.01)
    *G09G 5/38*           (2006.01)
    G06F 3/0483       (2013.01)
    G06F 3/0485       (2022.01)

(58) Field of Classification Search
    CPC .... G06F 3/0412; G06F 1/1601; G06F 3/1618; G06F 3/1622; G06F 3/1641; G06F 3/1652
    See application file for complete search history.

(56) References Cited

U.S. PATENT DOCUMENTS

| | | | |
|---|---|---|---|
| 2019/0311692 A1* | 10/2019 | Shai | G06F 1/1626 |
| 2020/0125144 A1* | 4/2020 | Chung | H04M 1/0216 |
| 2022/0197336 A1* | 6/2022 | Shai | G09G 5/003 |

FOREIGN PATENT DOCUMENTS

| | | |
|---|---|---|
| JP | 2014-035496 A | 2/2014 |
| JP | 2016-062220 A | 4/2016 |
| WO | 2006/123513 A1 | 11/2006 |

OTHER PUBLICATIONS

Khalilbeigi, Mohammadreza et al., FoldMe: interacting with double-sided foldable displays, 2012, ACM Digital Library Complete, pp. 33-40 (Year: 2012).*

Park, Jihun et al., Research on flexible display at Ulsan National Institute of Science and Technology, 2017, Nature Publishing Group, vol. 1 (1), p. 1-13, Article 9 ( Year:2017) (Year: 2017).*

Khaliloeigi, Mohammadreza et al., Fold Me: interacting with double-sided foldable displays, 2012, ACM Digital Library Complete, pp. 33-40 (Year: 2012) (Year: 2012).*

Feb. 6, 2024 Notice of Reasons for Refusal issued in Japanese Patent Application No. 2020-129712.

* cited by examiner

FIG. 5

| TYPE | ASPECT RATIO | MULTIPLE PAGES | SCROLLING | PRIORITY |
|---|---|---|---|---|
| MOVING IMAGE | LANDSCAPE | NO | NO | 1 |
|  | PORTRAIT | NO | NO | 1 |
| STILL IMAGE | LANDSCAPE | NO | NO | 1 |
|  |  | YES | NO | 1 |
|  |  | YES | YES | 1 |
|  | PORTRAIT | NO | NO | 1 |
|  |  | YES | NO | 1 |
|  |  | YES | YES | 1 |
| ... |  |  |  |  |
|  |  |  |  |  |
| DOCUMENT | LANDSCAPE | NO | NO | 1 |
|  |  | YES | NO | 1 |
|  |  | YES | YES | 1 |
|  | PORTRAIT | NO | NO | 1 |
|  |  | YES | NO | 1 |
|  |  | YES | YES | 1 |
| ... |  |  |  |  |
|  |  |  |  |  |
| IMAGE OPERATOR |  |  |  | 2 |
| MEMO |  |  |  | 2 |
| WIDGET |  |  |  | 3 |
| ... |  |  |  |  |

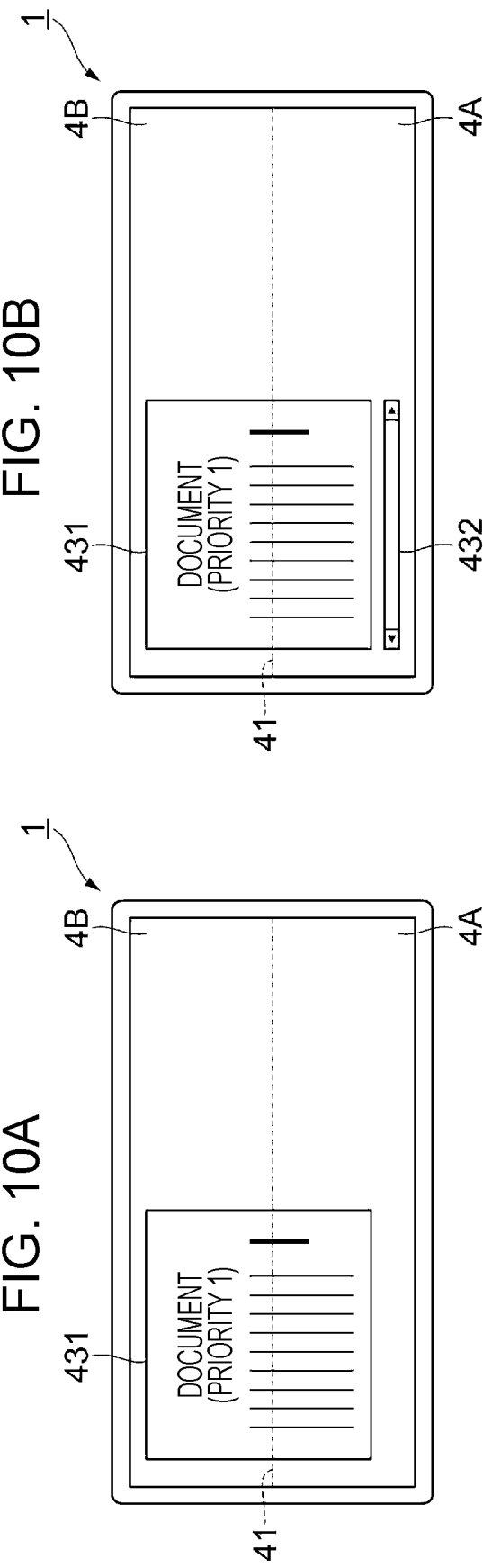
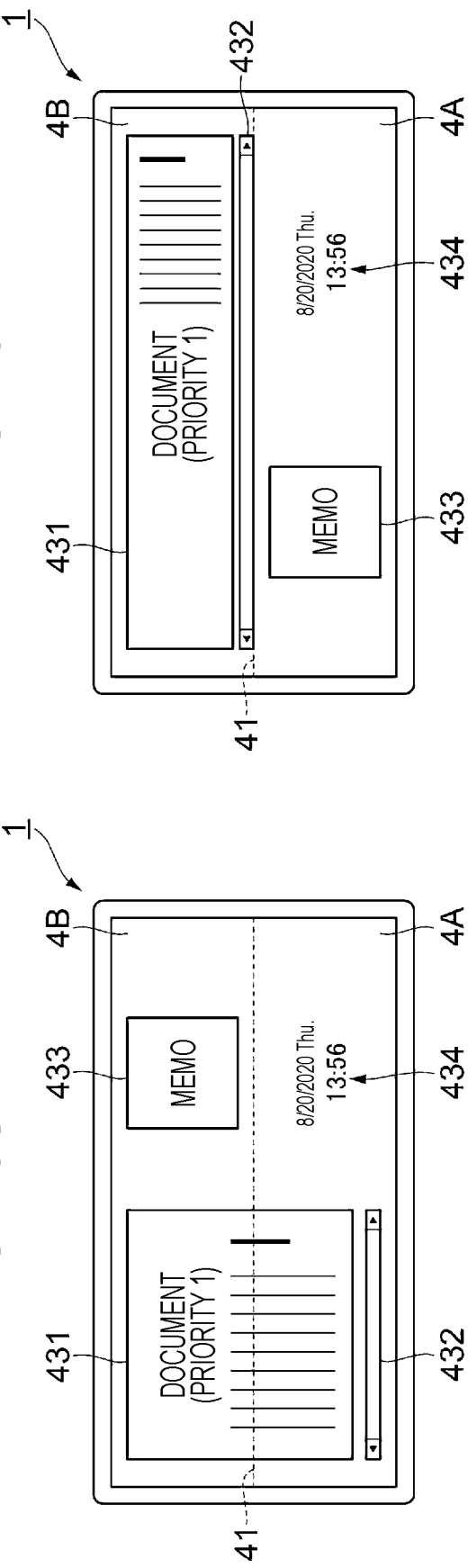

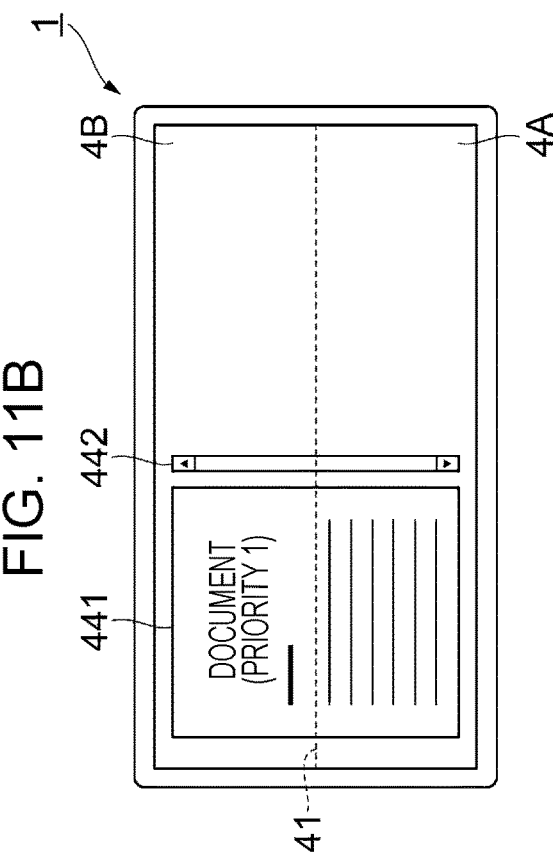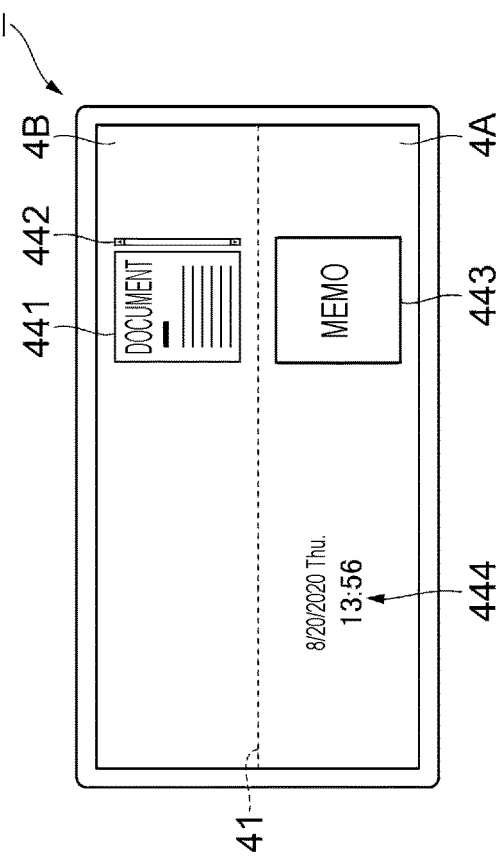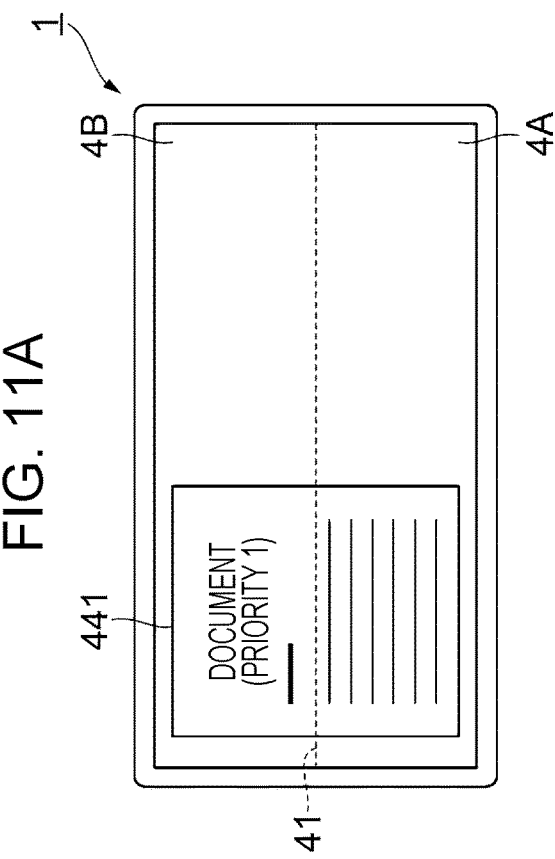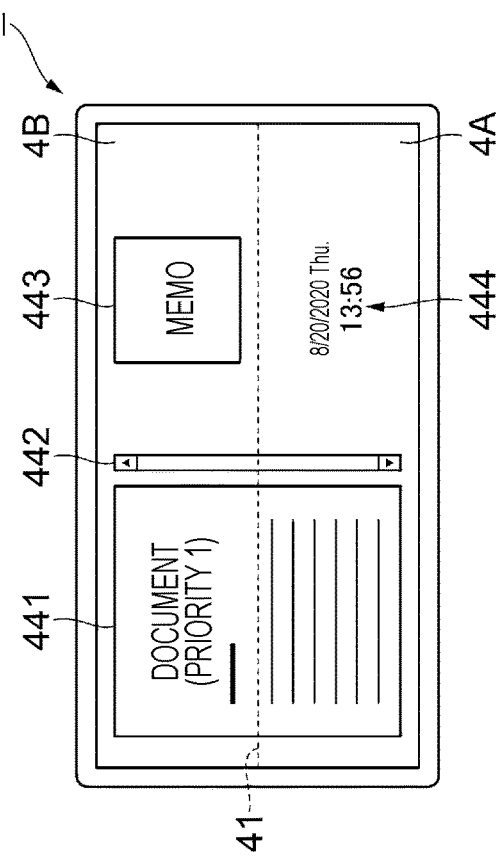

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-129712 filed Jul. 30, 2020.

BACKGROUND

(i) Technical Field

The present disclosure relates to an information processing apparatus and a non-transitory computer readable medium.

(ii) Related Art

To date, display devices having a deformable display surface have been put to practical use. In deforming the display surface, the display device itself is sometimes deformable at any position, and the deformation position is at other times limited to the position of a hinge prepared in advance.

SUMMARY

For example, Japanese Unexamined Patent Application Publication No. 6-19663 discloses an automatic control method for multiwindow. For a case where images are displayed on one display surface, there is provided a method in which each image is disposed such that an area used for displaying the image does not extend across a folded portion. This is because a line is recognized in the folded portion on occasions, and the view of the line causes a lowered image quality in many cases.

However, even though the line is seen, assigning an area extending horizontally or in contrast vertically provides a better view of an image, depending on the content of the image. In addition, for a multipage image, assigning an area extending in a direction of moving to a preceding page or a following page provides a better view of the image.

Aspects of non-limiting embodiments of the present disclosure relate to providing a better view of an image than in a case where assignment of areas to display images therein is decided with reference to the position of a folded portion resulting from the deformation of a display.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including a processor configured to, in response to dividing an area of a display surface of a deformable display into multiple areas with a folded portion located as a boundary between the multiple areas as a result of deformation of the deformable display, decide layout of multiple images to be displayed in the area of the display surface. The layout is decided on a basis of information regarding each of the multiple images.

BRIEF DESCRIPTION OF THE DRAWINGS

Exemplary embodiments of the present disclosure will be described in detail based on the following figures, wherein:

FIG. 5 is a table explaining an example of settings used in Exemplary Embodiment 1;

FIG. 6A illustrates an example of laying out the images not extending across a boundary; FIG. 6B illustrates an example of laying out the images including an image extending across the boundary;

FIGS. 10A to 10C are views explaining Layout Example 5 of images in the use of the display of the mobile terminal in a landscape orientation and explaining the process of deciding the layout of the images; FIG. 10D is a view explaining a comparative example in which the images are laid out not to extend across the boundary;

FIGS. 11A to 11C are views explaining Layout Example 6 of images in the use of the display of the mobile terminal in the landscape orientation and explaining the process of deciding the layout of the images; FIG. 11D is a view explaining a comparative example in which the images are laid out not to extend across the boundary;

FIG. 12A is a view explaining an example of laying out the images in the use of the display in the portrait orientation; FIG. 12B is a view explaining an example of laying out the images in the use of the display in the landscape orientation;

FIG. 15A illustrates a state where the mobile terminal is deformed in a direction along a diagonal of the display; FIG. 15B illustrates an example of setting the display areas after the deformation;

FIG. 16A illustrates a state where the mobile terminal is deformed in the direction along a diagonal of the display; FIG. 16B illustrates a layout example in the case of displaying portrait images; FIG. 16C illustrates a layout example in the case of displaying landscape images;

FIGS. 17A and 17B are respectively a front view and a side view of the mobile terminal; FIG. 17C is a view explaining an example of the deformation of the mobile terminal;

FIG. 18A illustrates an example of laying out the images extending in two or three display areas; FIG. 18B illustrates a comparative example in which the images are laid out in the respective display areas;

DETAILED DESCRIPTION

Hereinafter, exemplary embodiments of the present disclosure will be described with reference to the drawings.

Exemplary Embodiment 1

Exterior Configuration

Figure 1A:
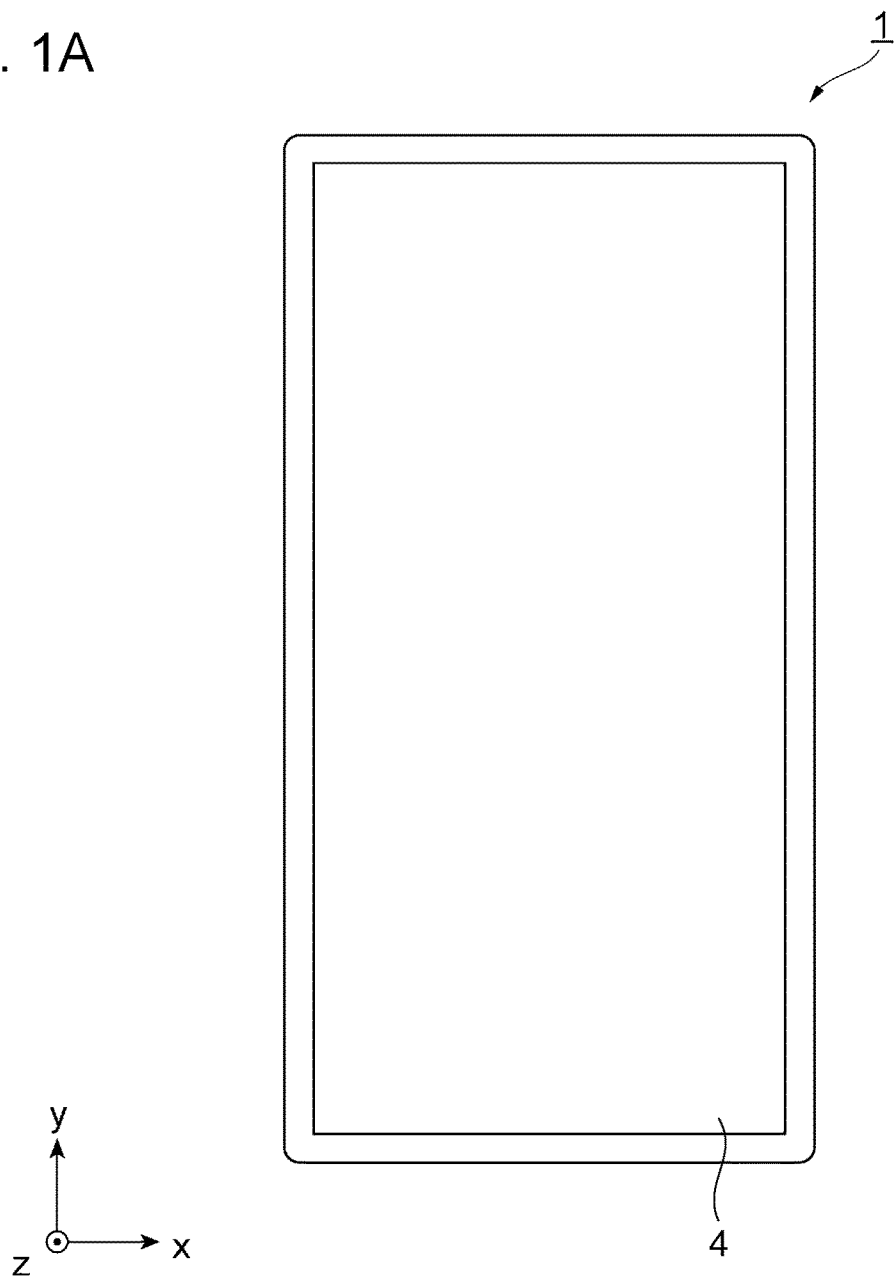
FIGS. 1A and 1B are views explaining an example exterior configuration of a portable mobile terminal used in Exemplary Embodiment 1 and are respectively a front view and a side view of the mobile terminal.
Figure 1B:
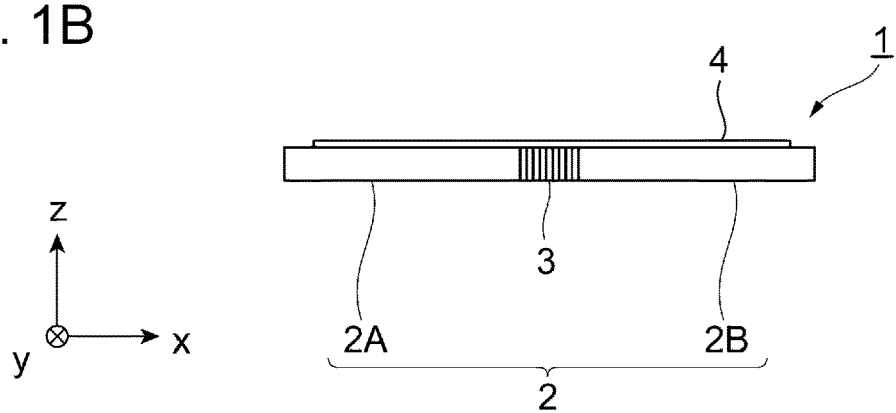

FIGS. 1A and 1B are views explaining an example exterior configuration of a portable terminal (hereinafter, also referred to as a mobile terminal) 1 used in Exemplary Embodiment 1 and are respectively a front view and a side view of the mobile terminal 1. The mobile terminal 1 is an example of an information processing apparatus.

For example, a tablet computer or a smartphone is assumed as the mobile terminal 1 illustrated in FIGS. 1A and 1B. The mobile terminal 1 may be a game machine or an electronic dictionary.

The mobile terminal 1 in this exemplary embodiment has a body 2 including two body panels 2A and 2B.

The body panels 2A and 2B have components (not illustrated) incorporated therein to enable the mobile terminal 1 to operate as a computer. The two body panels 2A and 2B are coupled to each other with a hinge 3 interposed therebetween. The hinge 3 used in this exemplary embodiment is installed at a position where each of short sides of the mobile terminal 1 is divided. The hinge 3 may be a connecting fitting or the like including a movable part and formed from a deformable material such as plastic, resin, or rubber.

In FIGS. 1A and 1B, short sides of a display 4 extend in an x axis direction, and long sides extend in a y axis direction. A length Ly of each long side of the mobile terminal 1 used in this exemplary embodiment is twice or more as long as a length Lx of each short side.

The display 4 used in this exemplary embodiment is deformable to have a V-letter shape with the hinge 3 placed at the bottom of the letter V. The position of the hinge 3 corresponds to the position of a folded portion.

The mobile terminal 1 in this exemplary embodiment is foldable and deformable in such a manner that a surface where the display 4 is provided forms a valley. The display 4 is thus formed as, for example, a film-shaped plastic plate formed from a foldable and deformable material.

The display 4 is composed of, for example, an organic electro luminescent (EL) display or a liquid crystal display. An image or other information is displayed on the surface of the display 4 (that is, a display surface).

Figure 2A:
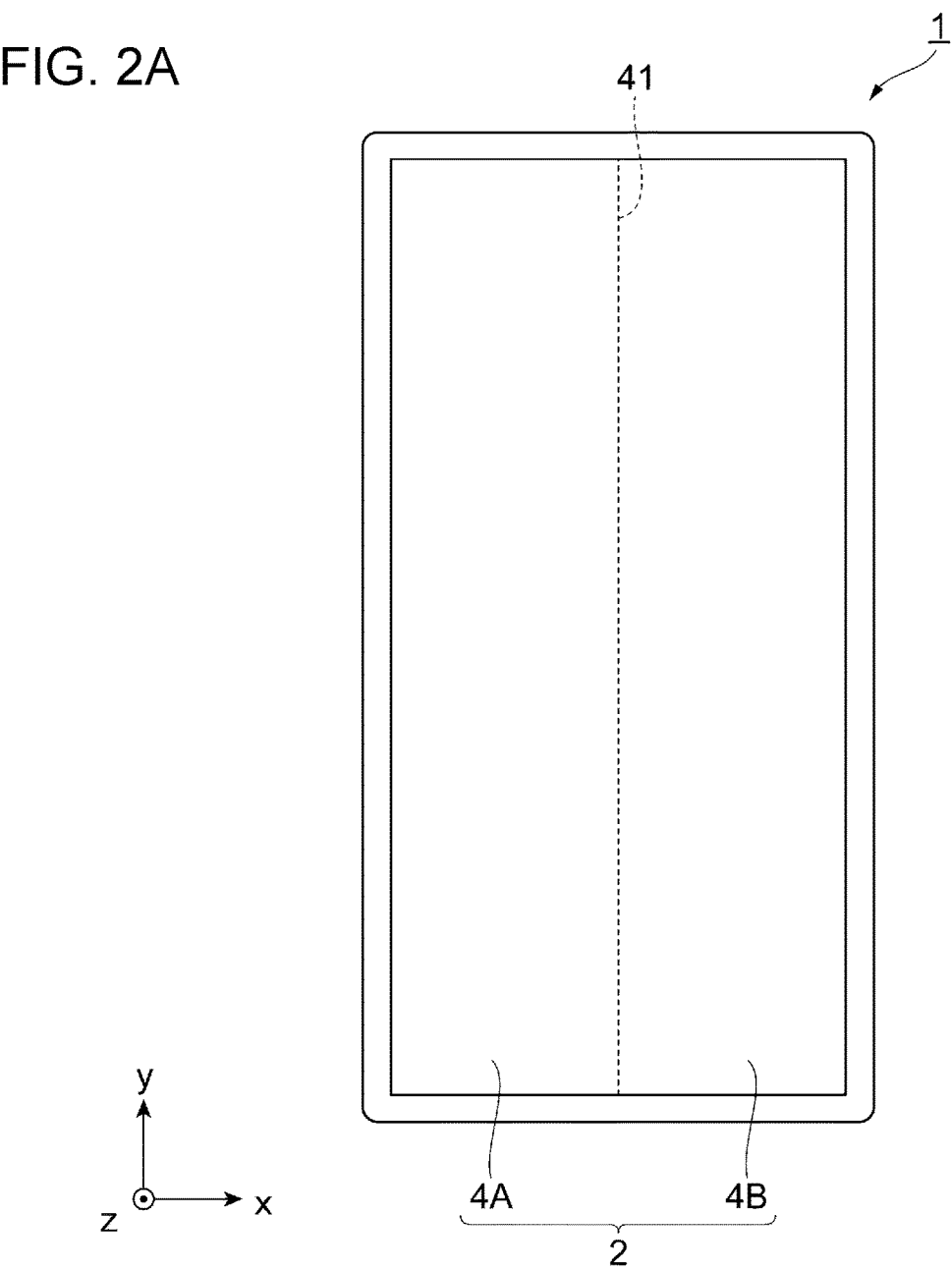
FIGS. 2A and 2B are views explaining two display areas generated as a result of the deformation of a display and a boundary indicating the position of a border therebetween and are respectively a front view and a side view of the mobile terminal.
Figure 2B:
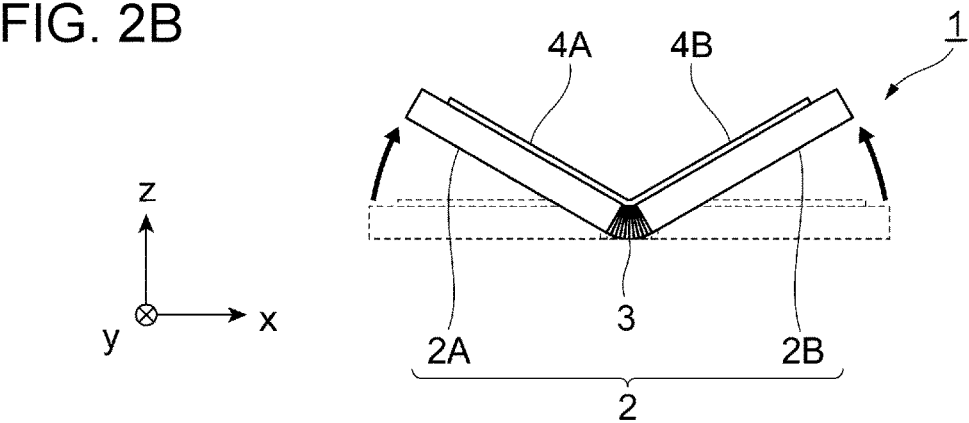

FIGS. 2A and 2B are views explaining two display areas 4A and 4B generated as the result of the deformation of the display 4 and a boundary 41 indicating the position of a border therebetween. FIGS. 2A and 2B are respectively a front view and a side view of the mobile terminal 1. Hereinafter, the display areas 4A and 4B are also referred to as a left area 4A and a right area 4B, respectively. This is because in the layout of the display 4 in which the boundary 41 extends vertically as illustrated in FIG. 2A, the left area 4A and the right area 4B are respective display areas located on the left side and the right side of the boundary 41, respectively, viewed from a user.

The boundary 41 is sometimes recognized as a fold and not recognized at other times. In addition, the boundary 41 is not recognized as a fold at the beginning but is recognized as a fold after aging in some cases.

The mobile terminal 1 manages the display 4 before the deformation as one display area and the display 4 after the deformation as the two display areas 4A and 4B.

The display areas 4A and 4B in this exemplary embodiment have the same shape. Accordingly, each long side of the display area 4A is four times or more as long as each short side thereof. The same holds true for the display area 4B.

Hardware Configuration

Figure 3:
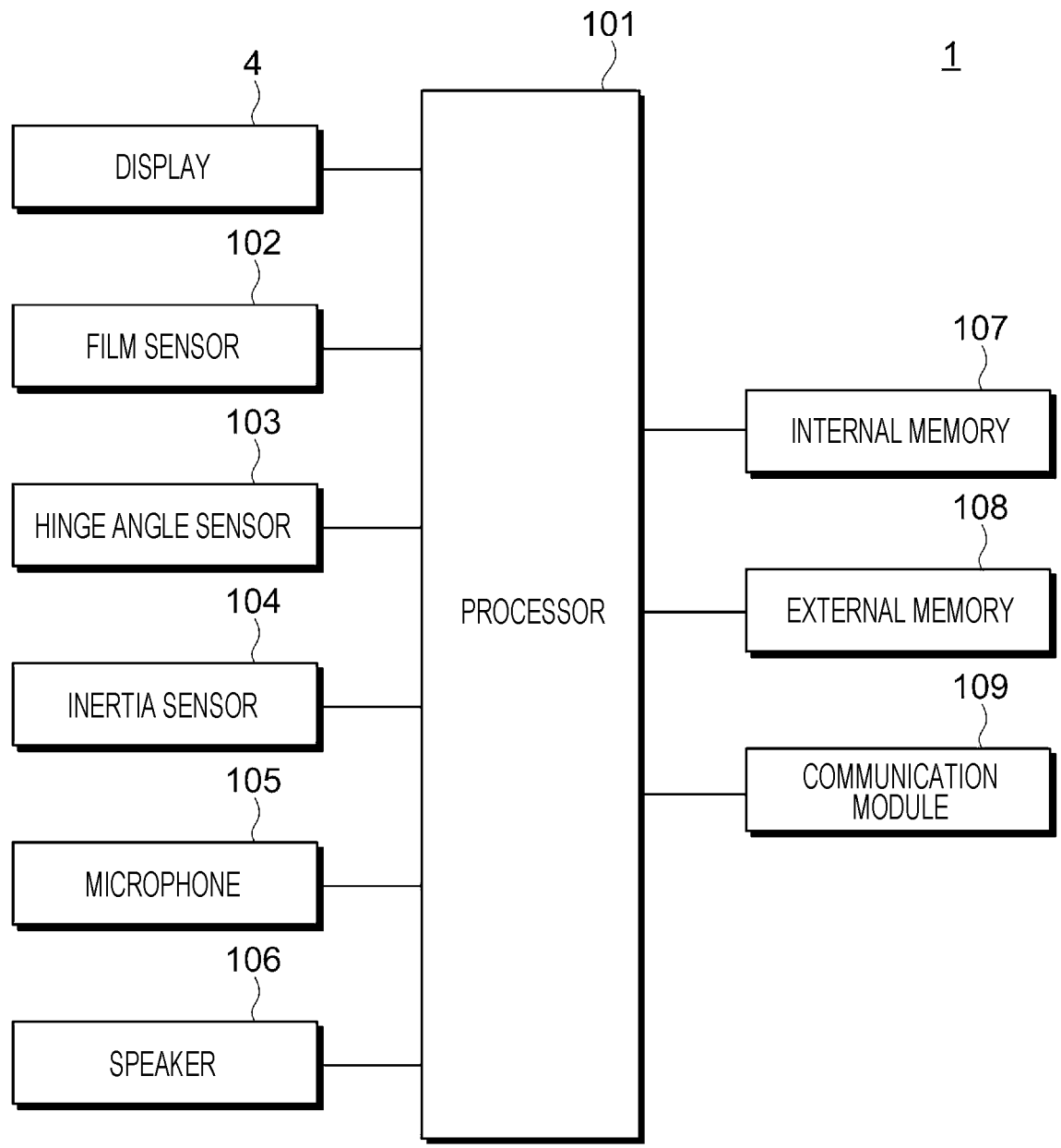
FIG. 3 is a view explaining an example hardware configuration of the mobile terminal used in Exemplary Embodiment 1.

FIG. 3 is a view explaining an example hardware configuration of the mobile terminal 1 used in Exemplary Embodiment 1.

The mobile terminal 1 used in this exemplary embodiment includes a processor 101 that controls the components of the mobile terminal 1 by running a program, a film-type electrostatic capacitance sensor (film sensor) 102 that detects an operation of a software key displayed on the display 4, a hinge angle sensor 103, an inertia sensor 104, a microphone 105 used for a telephone call or recording, a speaker 106 used for outputting sound, an internal memory 107 storing system data and internal data, an external memory 108 serving as an auxiliary memory, a communication module 109 used for communications with an external apparatus, and other components.

In this exemplary embodiment, the internal memory 107 and the external memory 108 are each a semiconductor memory. The internal memory 107 has a read only memory (ROM) storing a basic input output system (BIOS) and the like and a random access memory (RAM) used as a main memory. The processor 101 and the internal memory 107 are components of the computer. The processor 101 uses the RAM as a work space for programs. The external memory 108 stores firmware and apps.

The film sensor 102 is disposed on the surface of the display 4. The film sensor 102 has a property that does not hinder the view of information displayed on the display 4. The film sensor 102 thus detects the position of an operation by the user on the basis of an electrostatic capacitance change.

The hinge angle sensor 103 outputs information regarding an angle formed by the body panels 2A and 2B after the body 2 is deformed with the hinge 3 centered thereon. In other words, the hinge angle sensor 103 outputs a folding angle. Information such as the number of rotations or the rotation angle of a toothed wheel included in the hinge 3 may be output as the information indicating the folding angle.

The inertia sensor 104 is a six-axis sensor that detects, for example, acceleration and angular velocity. The inertia sensor 104 enables detection of the attitude of the mobile terminal 1 in use.

The microphone 105 is a device that converts voice of the user and sound around the user to an electric signal.

The speaker 106 is a device that converts the electric signal to sound and outputs the sound.

The communication module 109 conforms to standards for, for example, mobile communication systems in multiple generations, a wireless local area network (LAN), Bluetooth (registered trademark), and a universal serial bus (USB).

The standards for mobile communication systems include, for example, the fourth generation technology standard (4G) and the fifth generation technology standard (5G). Examples of the standards for the wireless LAN include 11a, 11b, 11g, 11n, 11ac, 11ad, and 11ax in IEEE 802.11.

Deciding Layout of Images

Figure 4:
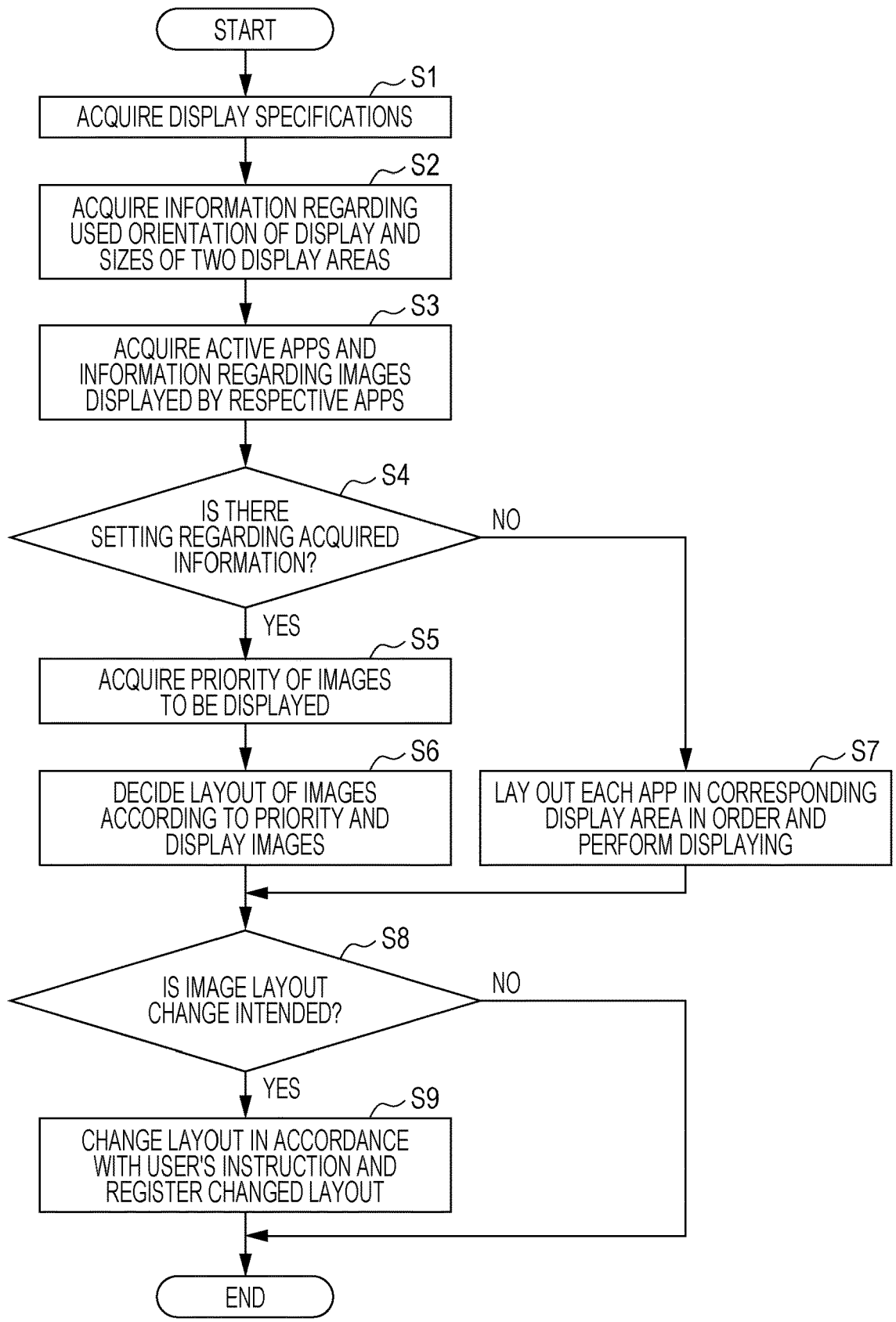
FIG. 4 is a flowchart explaining an example of a method for deciding the layout of images to be displayed on the display.

FIG. 4 is a flowchart explaining an example of a method for deciding the layout of images to be displayed on the display 4. The processing illustrated in FIG. 4 is performed by the processor 101 (see FIG. 3), and reference S in FIG. 4 denotes a step.

In FIG. 4, the processor 101 first acquires the specifications of the display 4 (step S1). Information such as the screen size, the resolutions, and the aspect ratio of the display 4 is herein acquired as the specifications. The aspect ratio is a ratio of a horizontal dimension of the screen to a vertical dimension and is an example of a screen ratio.

The processor 101 then acquires information such as the used orientation of the display 4, the sizes of the two display areas 4A and 4B, and the like (step S2). To determine the used orientation, for example, output from the inertia sensor 104 is used. In this exemplary embodiment, whether the long sides of the display 4 extend vertically or horizontally viewed from the user is determined. In other words, whether the boundary 41 extends vertically or horizontally viewed from the user is determined. In this exemplary embodiment, if the display 4 is used with the long sides of the display 4 extending vertically, the use of the display 4 is referred as use in a portrait orientation. If the display 4 is used with the long sides of the display 4 extending horizontally, the use of the display 4 is referred as use in a landscape orientation.

The processor 101 then acquires active apps and the information or the like regarding images displayed by the apps (step S3). The apps in this step are limited to apps displaying images on the display 4. Any app running in the background is thus ignored.

The information regarding each image includes the type and the aspect ratio of the image, whether the image has multiple pages, whether the image is to be scrolled, and the like. The pieces of information are acquired, for example, from each app. In this exemplary embodiment, the type of the image is classified as a moving image, a still image, a document, an image operator, a memo, a gadget, or the like. The moving image, the still image, the document, the image operator, the memo, the gadget, and the like are each an example of an image in this case.

In this exemplary embodiment, an image having a horizontal dimension longer than a vertical dimension is referred to as a landscape image, or the aspect ratio of the image is referred to as landscape. An image having a vertical dimension longer than a horizontal dimension is referred to as a portrait image, or the aspect ratio of the image is referred to as portrait.

Examples of the moving image include a television image and a video image. The moving image also includes an icon having display content changing with the elapse of time. However, in this exemplary embodiment, an icon is handled as a type different from the moving image. The icon is used to activate a specific app and call a specific screen or the like.

Examples of the still image include a photograph, a map, an information board, a sign, and an icon. The icon denotes an icon having content not changing with the elapse of time.

Examples of the document include an image created by software for office work, an image optically read by a scanner, an e-mail, a fax image, and a web image.

Examples of the operator include software keys, a scroll bar, and an image. The software keys and the scroll bar are used for designating operation of a moving image, a still image, and other images. The image is used for an instruction for reproduction, stopping, changing pages, or scrolling. The operator in this exemplary embodiment is an image accompanying the moving image or the still image. The operator is thus basically disposed near the moving image or the still image to be controlled.

Examples of the memo include a list of tasks or the like, a remark, a note, a tag, and a memo pad. In this exemplary embodiment, the memo corresponds to an app for which input in or display of a document is simplified or limited.

The widget denotes an interface used for displaying information and an icon used, for example, for activating an app. The widget corresponds to an app specialized for a specific purpose.

The processor 101 then determines whether there is a setting regarding the acquired information or the like (step S4).

FIG. 5 is a table explaining an example of settings used in Exemplary Embodiment 1. The settings illustrated in FIG. 5 are stored, for example, in the external memory 108.

In the settings illustrated in FIG. 5, each image has pieces of information regarding a type, an aspect ratio, multiple pages, scrolling, and priority.

In this exemplary embodiment, the aspect ratio is designated by an app. However, a display size varies depending on the area assigned to the app. The aspect ratio of each image is classified as landscape or portrait in FIG. 5 but may be specified by using a specific value such as 4:3 or 16:9. Software keys as the operator of the image have various shapes, arrangements, and the like, and thus aspect ratio classification therefor is not described in FIG. 5. The same holds true for the memo and the widget.

The term "multiple pages" denotes that an image managed on the basis of a page has multiple pages. The image is represented by a text document created by, for example, software for office work. Note that if the image has multiple pages, but if all the pages are laid out in one area in a layout for laying out pages in one area, the image does not have to be scrolled.

If the image has one page, but if the entire image is not small enough to be included in the area, the image has to be scrolled. However, this setting is not taken into consideration in the table.

Priority provides the order in which display areas for laying out images are decided. In this exemplary embodiment, the numeral "1" denotes a top priority, the numeral "2" ranks next to the numeral "1", and the numeral "3" ranks next to the numeral "2".

Accordingly, if multiple images are to be displayed, an area for laying out an image having the priority "1" is decided earlier than for images having the priority "2" and "3". If images have the same priority, an image for which an area is to be decided earlier is determined in accordance with a predetermined rule. For example, a moving image is given priority over a still image. In addition, for example, an image having a larger data amount is given priority over an image having a smaller data amount.

Referring again to FIG. 4, the description is continued.

If there is a setting regarding the acquired information or the like, the processor 101 obtains an affirmative result in step S4. In this case, the processor 101 acquires the priority of each image to be displayed (step S5). The processor 101 then decides the layout of the image according to the priority thereof (step S6).

In contrast, there is not a setting regarding the acquired information or the like, the processor 101 obtains a negative result in step S4. In this case, the processor 101 lays out each app in the corresponding display area in order and performs displaying (step S7). The order of the assignment is decided, for example, in the order of the app activation.

As described above, the processor 101 decides the initial layout and performs the displaying. Nevertheless, there is a case where the user intends to change the layout decided by the processor 101.

The processor 101 thus determines whether image layout change is intended after step S6 or S7 (step S8).

If an affirmative result is obtained in step S8, the processor 101 changes the layout in accordance with an instruction from the user and registers the changed layout (step S9). If there is information regarding a layout registered by the user, the processor 101 gives priority to the layout registered by the user when deciding the layout in steps S5 and S6.

If a negative result is obtained in step S8, the processor 101 terminates the processing for deciding the image layout.

Layout Examples of Images

Hereinafter, examples of laying out images will be described with reference to FIGS. 6A to 12B.

Layout Example 1

Figure 6A:
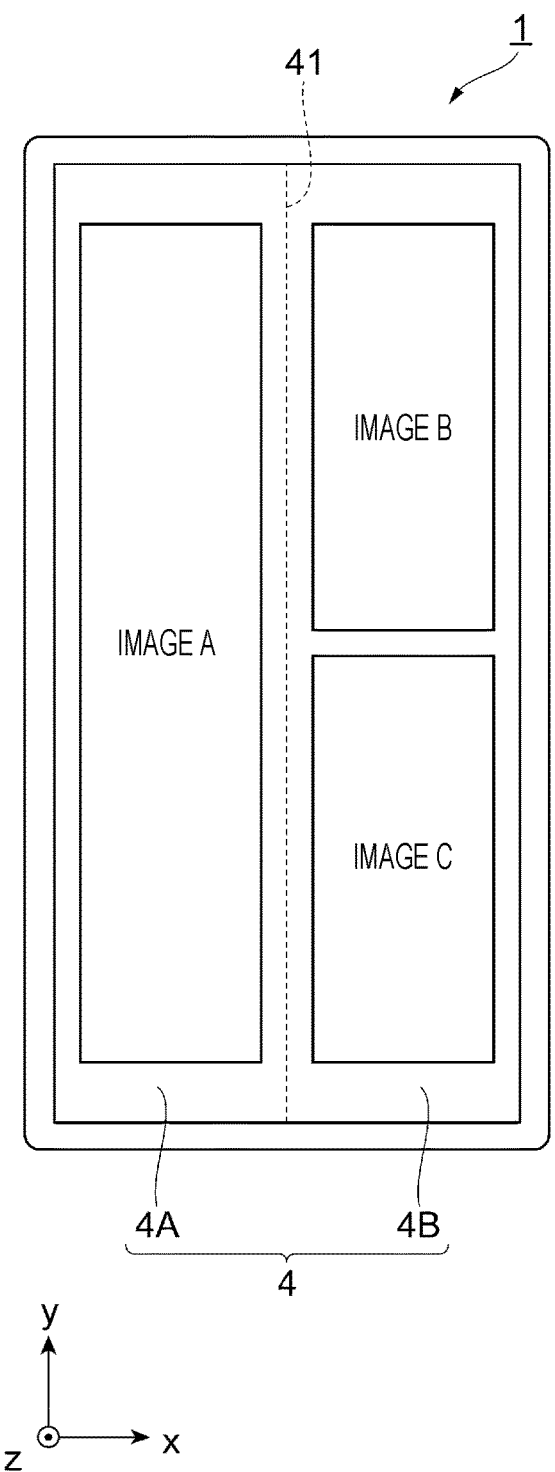
FIGS. 6A and 6B are views explaining Layout Example 1 of images in the use of the display of the mobile terminal in a portrait orientation.
Figure 6B:
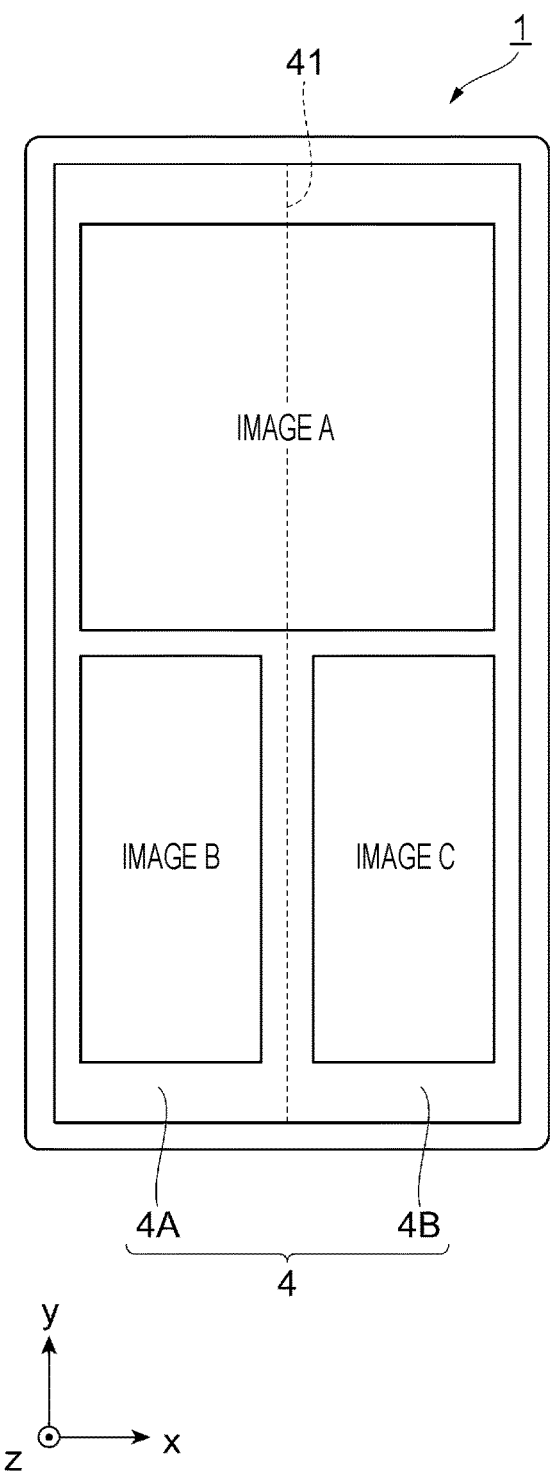

FIGS. 6A and 6B are views explaining Layout Example 1 of images in the use of the display 4 of the mobile terminal 1 in the portrait orientation. FIG. 6A illustrates an example of laying out the images not extending across the boundary 41. FIG. 6B illustrates an example of laying out the images including an image extending across the boundary 41.

In FIG. 6A, an image A is disposed in the left area 4A, and an image B and an image C are disposed in the respective upper and lower parts of the right area 4B.

In contrast, in FIG. 6B, the image A is disposed to extend in the left area 4A and the right area 4B, the image B is disposed in the lower part of the left area 4A, and the image C is disposed in the lower part of the right area 4B.

The images have almost the same area in FIGS. 6A and 6B.

However, if the image A is a portrait image and is to be scrolled vertically, the layout illustrated in FIG. 6A provides the user with better visibility than the layout illustrated in FIG. 6B.

In contrast, if the image A is a landscape image and is to be scrolled horizontally, the layout illustrated in FIG. 6B enables the image A to be displayed in a large size without changing the aspect ratio, although the boundary 41 recognized as a line deteriorates the image quality of the image A. Accordingly, in displaying the image A, the layout illustrated in FIG. 6B provides the user with better visibility.

As described above, the image layout providing the user with better visibility is decided on the basis of the information regarding the image.

Layout Example 2

Figure 7A:
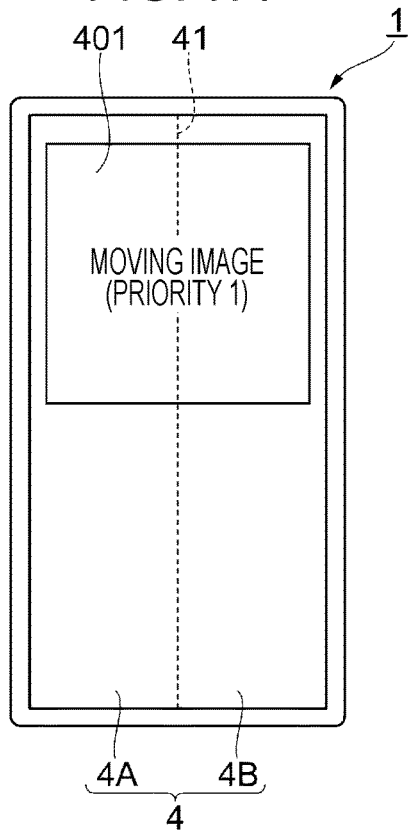
FIGS. 7A to 7C are views explaining Layout Example 2 of images in the use of the display of the mobile terminal in the portrait orientation and explaining the process of deciding the layout of the images.
Figure 7B:
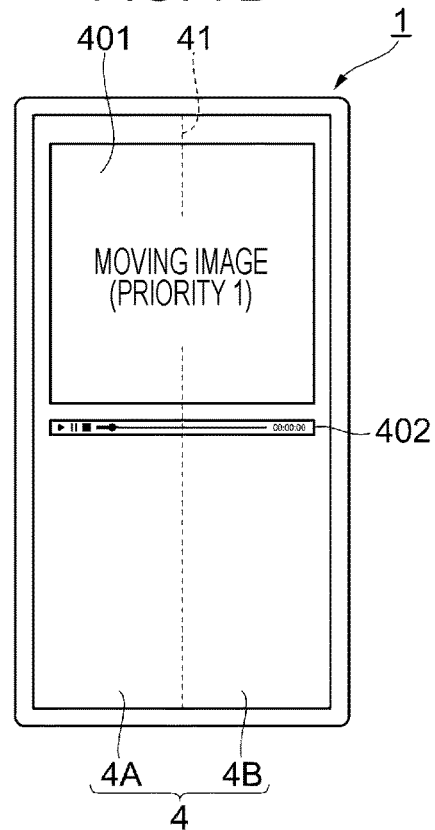
Figure 7C:
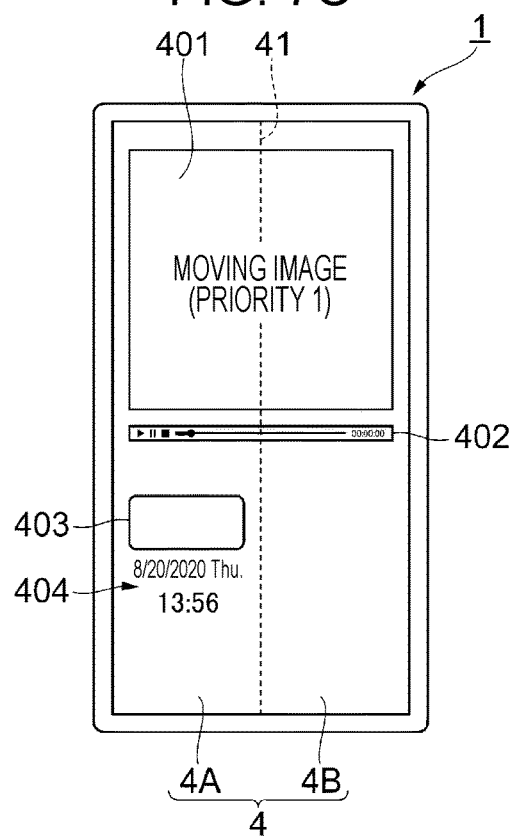
Figure 7D:
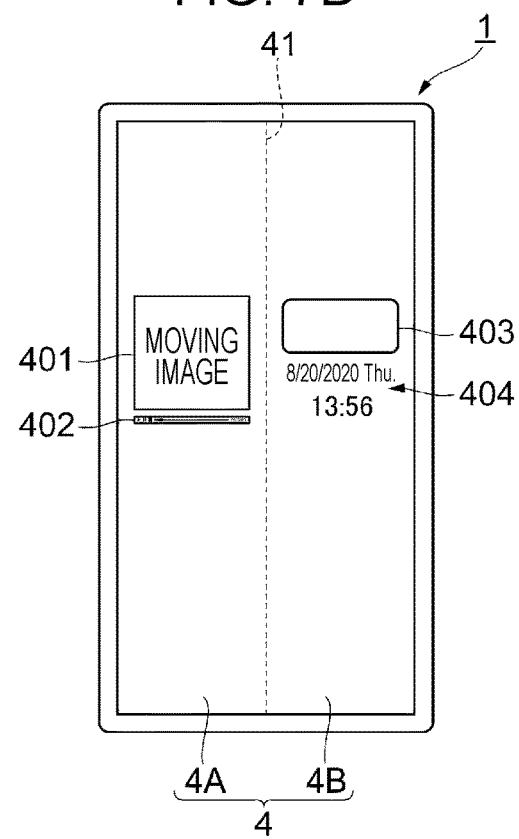
FIG. 7D is a view explaining a comparative example in which the images are laid out not to extend across the boundary.

FIGS. 7A to 7C are views explaining Layout Example 2 of images in the use of the display 4 of the mobile terminal 1 in the portrait orientation. FIGS. 7A to 7C are views explaining the process of deciding the layout of the images. FIG. 7D is a view explaining a comparative example in which the images are laid out not to extend across the boundary 41.

The layout examples illustrated in FIGS. 7A to 7D assume that a moving image 401 having the priority "1", an operator 402 and a memo 403 each having the priority "2", and a widget 404 having the priority "3" are laid out on the display 4.

In this case, only the image of the moving image 401 has the priority "1". Accordingly, the layout of the moving image 401 is first decided. Since the moving image 401 assumed in FIGS. 7A to 7C is a landscape image, the layout of the moving image 401 therein is decided to extend the moving image 401 in both of the left area 4A and the right area 4B. FIG. 7A illustrates a state where the layout of the moving image 401 is decided.

Two respective images of the operator 402 and the memo 403 have the priority "2". The operator 402 has a higher correlation with the moving image 401 having the priority "1", and thus the layout of the operator 402 is decided earlier than the layout of the memo 403. In FIGS. 7A to 7D, the operator 402 is composed of a software key used for an instruction to reproduce or stop the moving image 401 and a temporal axis indicating the current time point in the reproduction. FIG. 7B illustrates a state where the layout of the operator 402 is decided. The operator 402 is disposed to extend along the lower side of the moving image 401 in FIGS. 7B to 7D.

Thereafter, the layout of the memo 403 having the same priority is decided, and then the layout of the widget 404 having the priority "3" is decided. FIG. 7C illustrates a state where the layout of all of the images is decided.

FIG. 7D illustrates a comparative example for reference. FIG. 7D illustrates a layout example of a case where areas to be assigned are each decided on the basis of a corresponding one of the apps. FIG. 7D illustrates a layout in which the aspect ratio of the moving image 401 is kept. In this case, since the moving image 401 is disposed in the left area 4A, the displayed moving image 401 is considerably smaller than that in the layout in FIG. 7A and thus has lower visibility. The lower visibility affects more than the boundary 41 recognized as a line does.

Layout Example 3

Figure 8A:
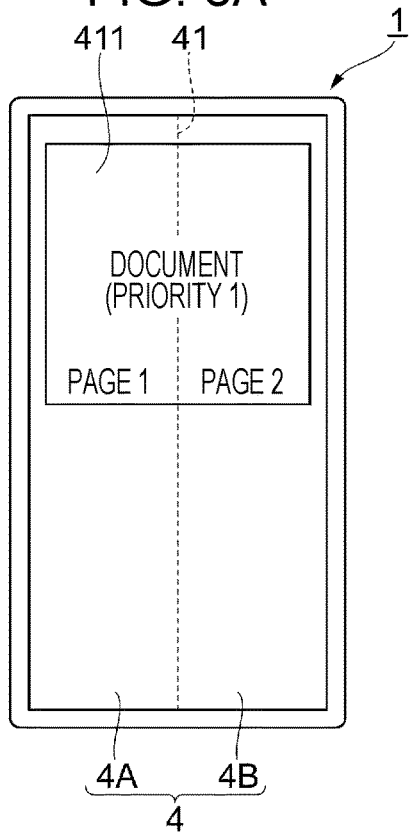
FIGS. 8A to 8C are views explaining Layout Example 3 of images in the use of the display of the mobile terminal in the portrait orientation and explaining the process of deciding the layout of the images.
Figure 8B:
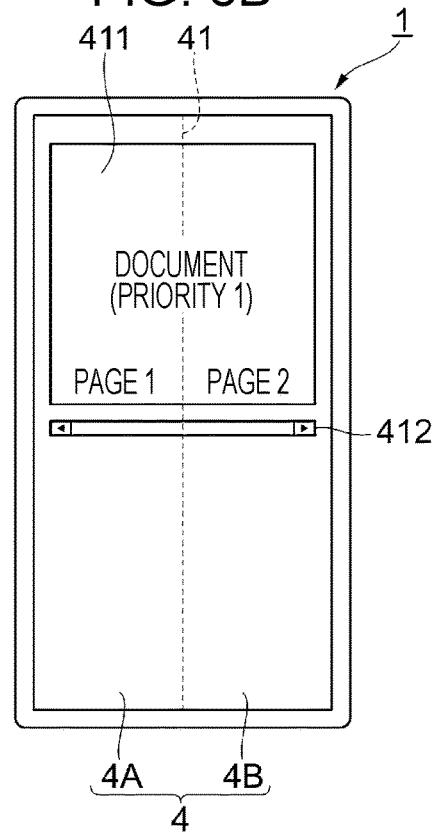
Figure 8C:
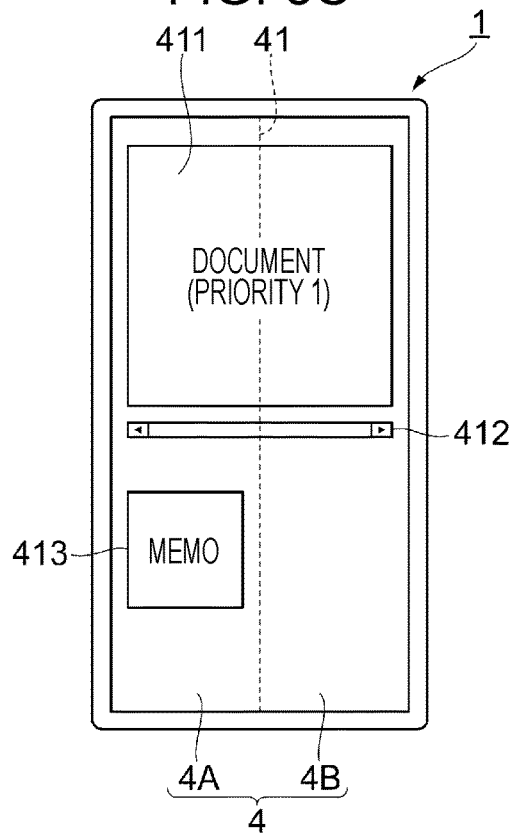
Figure 8D:
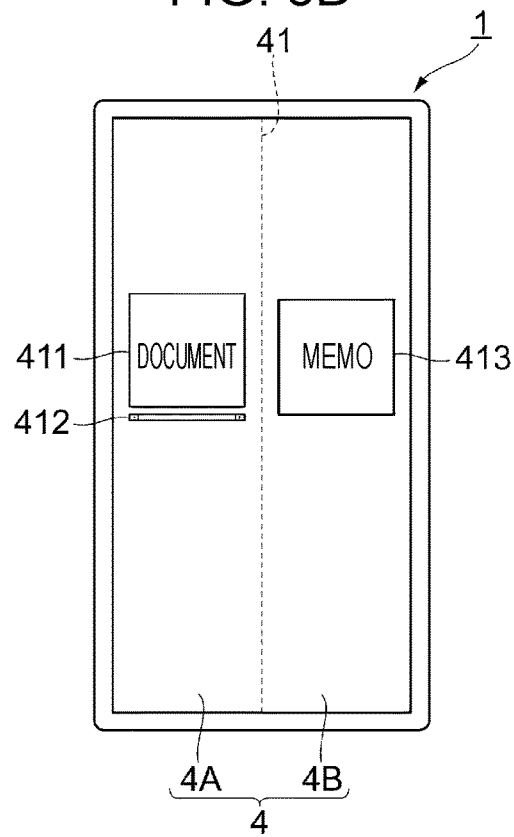
FIG. 8D is a view explaining a comparative example in which the images are laid out not to extend across the boundary.

FIGS. 8A to 8C are views explaining Layout Example 3 of images in the use of the display 4 of the mobile terminal 1 in the portrait orientation. FIGS. 8A to 8C are views explaining the process of deciding the layout of the images. FIG. 8D is a view explaining a comparative example in which the images are laid out not to extend across the boundary 41.

The layout examples illustrated in FIGS. 8A to 8D assume that a document 411 having the priority "1", an operator 412 having the priority "2", and a memo 413 are laid out on the display 4.

In this case, only the image of the document 411 has the priority "1". Accordingly, the layout of the document 411 is first decided. Since the document 411 assumed in FIGS. 8A to 8C is a landscape image having two pages laid out side by side, the layout of the document 411 therein is decided to extend the document 411 in both of the left area 4A and the right area 4B. FIG. 8A illustrates a state where the layout of the document 411 is decided.

Two respective images of the operator 412 and the memo 413 have the priority "2". However, the operator 412 has a higher correlation with the document 411 having the priority "1", and thus the layout of the operator 412 is decided earlier than the layout of the memo 413. In FIGS. 8A to 8D, the operator 412 is composed of a software key used for an instruction to change pages of the document 411 and a slider indicating the current page out of all of the pages. FIG. 8B illustrates a state where the layout of the operator 412 is decided.

Thereafter, the layout of the memo 403 having the same priority is decided. FIG. 8C illustrates a state where the layout of all of the images is decided.

FIG. 8D illustrates a comparative example for reference. FIG. 8D illustrates a layout example of a case where areas to be assigned are each decided on the basis of a corresponding one of the apps. FIG. 8D illustrates the layout in which the aspect ratio of the document 411 is kept. In this case, since the document 411 is disposed in the left area 4A, the displayed document 411 is considerably smaller than that in the layout in FIG. 8A and thus has lower visibility. The lower visibility affects more than the boundary 41 recognized as a line does.

Layout Example 4

Figure 9A:
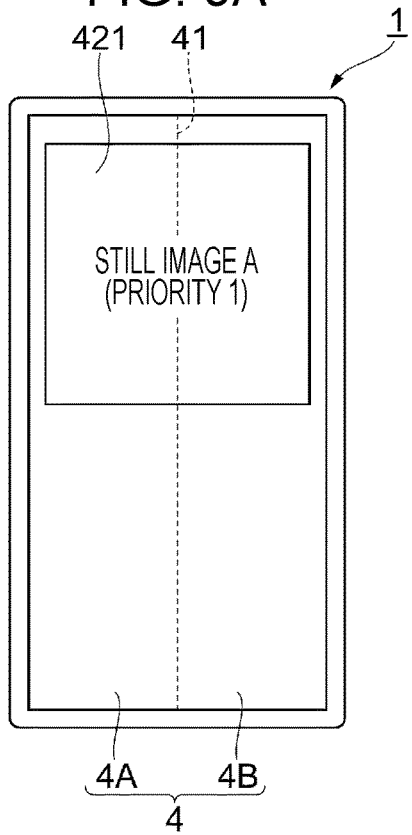
FIGS. 9A to 9C are views explaining Layout Example 4 of images in the use of the display of the mobile terminal in the portrait orientation and explaining the process of deciding the layout of the images.
Figure 9B:
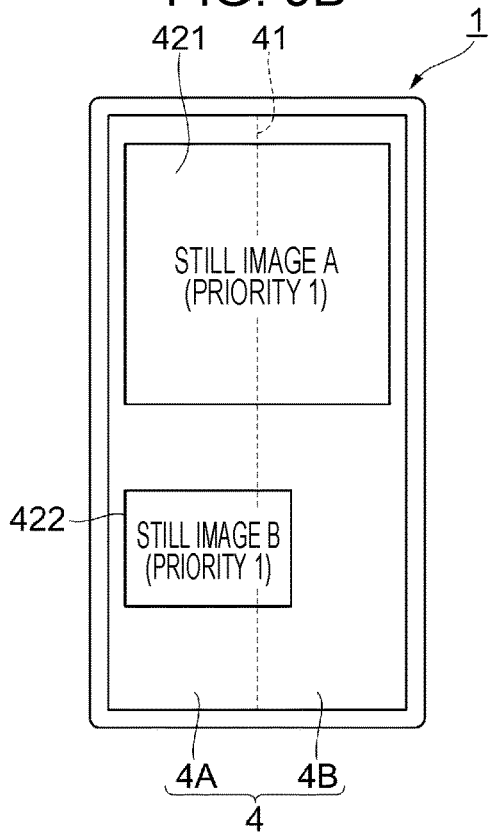
Figure 9C:
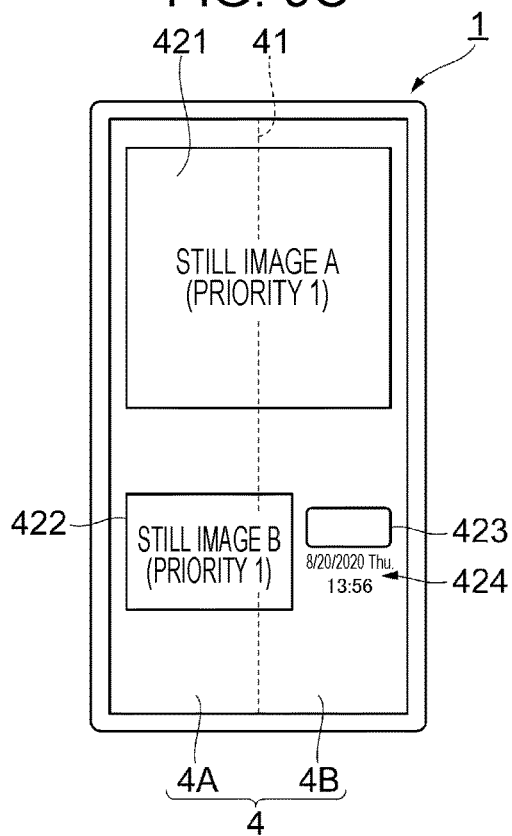
Figure 9D:
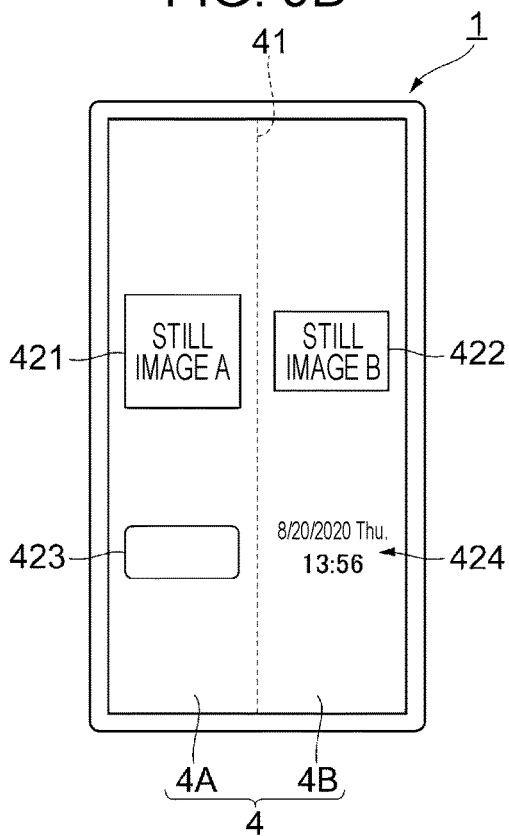
FIG. 9D is a view explaining a comparative example in which the images are laid out not to extend across the boundary.

FIGS. 9A to 9C are views explaining Layout Example 4 of images in the use of the display 4 of the mobile terminal 1 in the portrait orientation. FIGS. 9A to 9C are views explaining the process of deciding the layout of the images. FIG. 9D is a view explaining a comparative example in which the images are laid out not to extend across the boundary 41.

The layout examples illustrated in FIGS. 9A to 9D assume that a still image 421 and a still image 422 each having the priority "1", a memo 423 having the priority "2", and a widget 424 having the priority "3" are laid out on the display 4.

In FIGS. 9A to 9C, two respective images of the still image 421 and the still image 422 have the priority "1". Accordingly, an image to be disposed first is decided between the still image 421 and the still image 422. In FIGS. 9A to 9C, the layout of the still image 421 of a larger size in displaying is first decided. Generally, the larger the size, the larger a data amount. Nevertheless, there is an exception.

Since the still image 421 assumed in FIGS. 9A to 9C is a landscape image, the layout of the still image 421 therein is decided to extend the still image 421 in both of the left area 4A and the right area 4B. FIG. 9A illustrates a state where the layout of the still image 421 is decided.

Subsequently, the layout of the still image 422 having the same priority "1" is decided. The still image 422 is also a landscape image; however, the app specifies a smaller image size than that of the still image 421. The still image 422 is disposed in an unoccupied area. The layout of the landscape still image 422 is also decided to extend the still image 422 in both of the left area 4A and the right area 4B. FIG. 9B illustrates a state where the layout of the still image 422 is decided.

The second highest priority is "2". The image of the memo 423 has the priority "2". The memo 423 is disposed in the lower part that is an unoccupied area of the right area 4B. Thereafter, the layout of the widget 424 that is an image having the priority "3" is disposed in the last remaining unoccupied area. FIG. 9C illustrates a state where the layout of the memo 423 and the widget 424 is decided.

FIG. 9D illustrates a comparative example for reference. FIG. 9D illustrates a layout example of a case where areas to be assigned are each decided on the basis of a corresponding one of the apps. FIG. 9D illustrates the layout in which the aspect ratios of the still image 421 and the still image 422 are kept. In this case, the still image 421 and the still image 422 are respectively disposed in the left area 4A and the right area 4B. Since the width of each of the still image 421 and the still image 422 is limited to the width of a corresponding one of the left area 4A and the right area 4B, the displayed still images 421 and 422 are considerably smaller than those in the layout in FIG. 9A and thus have lower visibility. The lower visibility affects more than the boundary 41 recognized as a line does.

Layout Example 5

FIGS. 10A to 10C are views explaining Layout Example 5 of images in the use of the display 4 of the mobile terminal 1 in the landscape orientation. FIGS. 10A to 10C are views explaining the process of deciding the layout of the images. FIG. 10D is a view explaining a comparative example in which the images are laid out not to extend across the boundary 41.

The layout examples illustrated in FIGS. 10A to 10D assume that a document 431 having the priority "1", an operator 432 and a memo 433 each having the priority "2", and a widget 434 having the priority "3" are laid out on the display 4. In FIGS. 10A to 10D, the boundary 41 extends horizontally.

In FIGS. 10A to 10C, only the image of the vertically written document 431 has the priority "1". Accordingly, the layout of the document 431 is first decided. Since the document 431 assumed in FIGS. 10A to 10C is an image of a vertically written document, the layout of the document 431 therein is decided to make the vertical dimension of the document 431 longer than the horizontal dimension and to extend the document 431 in both of the left area 4A and the right area 4B. FIG. 10A illustrates a state where the layout of the document 431 is decided.

Two respective images of the operator 432 and the memo 433 have the priority "2". However, the operator 432 has a higher correlation with the document 431 having the priority "1", and thus the layout of the operator 432 is decided earlier than the layout of the memo 433. In FIGS. 10B to 10D, the operator 432 is composed of a scroll bar for designating the displayed part of the document 431. FIG. 10B illustrates a state where the layout of the operator 432 is decided.

Subsequently, the layout of the memo 433 having the same priority is decided, and then the layout of the widget 434 having the priority "3" is decided. FIG. 10C illustrates a state where the layout of the memo 433 and the widget 434 is decided.

FIG. 10D illustrates a comparative example for reference. FIG. 10D illustrates a layout example of a case where areas to be assigned are each decided on the basis of a corresponding one of the apps. FIG. 10D illustrates a case where the layout of the document 431 is decided not to extend the document 431 across the boundary 41. In this case, the document 431 and the memo 433 are respectively disposed in the right area 4B and the left area 4A. Since the vertical dimension of the document 431 is limited to the vertical dimension of the right area 4B, the displayed document 431 has a vertical dimension considerably shorter than that in the layout in FIG. 10A and thus has lower visibility. The lower visibility affects more than the boundary 41 recognized as a line does.

Layout Example 6

FIGS. 11A to 11C are views explaining Layout Example 6 of images in the use of the display 4 of the mobile terminal 1 in the landscape orientation. FIGS. 11A to 11C are views explaining the process of deciding the layout of the images. FIG. 11D is a view explaining a comparative example in which the images are laid out not to extend across the boundary 41.

The layout examples illustrated in FIGS. 11A to 11C assume that a document 441 having the priority "1", an operator 442 and a memo 443 each having the priority "2", and a widget 444 having the priority "3" are laid out on the display 4. In FIGS. 11A to 11D, the boundary 41 also extends horizontally.

In FIGS. 11A to 11C, only the image of the horizontally written document 441 has the priority "1". Accordingly, the layout of the document 441 is first decided. Since the document 441 is scrolled vertically in FIGS. 11A to 11C, the layout therein is decided to make the vertical dimension of the document 441 longer than the horizontal dimension and to extend the document 441 in both of the left area 4A and the right area 4B. FIG. 11A illustrates a state where the layout of the document 441 is decided. In FIGS. 11A to 11D, the aspect ratio of the document 441 is kept.

Two respective images of the operator 442 and the memo 443 have the priority "2". However, the operator 442 has a higher correlation with the document 441 having the priority "1", and thus the layout of the operator 442 is decided earlier than the layout of the memo 443. In FIGS. 11B to 11D, the operator 442 is composed of a scroll bar for designating the displayed part of the document 441. FIG. 11B illustrates a state where the layout of the operator 442 is decided. In FIGS. 11A to 11D, the document 441 is scrolled to move the displayed part vertically.

Subsequently, the layout of the memo 443 having the same priority is decided, and then the layout of the widget 444 having the priority "3" is decided. FIG. 11C illustrates a state where the layout of the memo 443 and the widget 444 is decided.

FIG. 11D illustrates a comparative example for reference. FIG. 11D illustrates a layout example of a case where areas to be assigned are each decided on the basis of a corresponding one of the apps. FIG. 11D illustrates a case where the layout of the document 441 is decided not to extend the document 441 across the boundary 41. In this case, the document 441 is disposed in the right area 4B with the aspect ratio thereof kept, and the memo 443 is disposed in the left area 4A. Since the vertical dimension of the document 441 is limited to the vertical dimension of the right area 4B, the displayed document 441 has a vertical dimension considerably shorter than that in the layout in FIG. 11A and thus has lower visibility. The lower visibility affects more than the boundary 41 recognized as a line does.

Layout Example 7

Figure 12A:
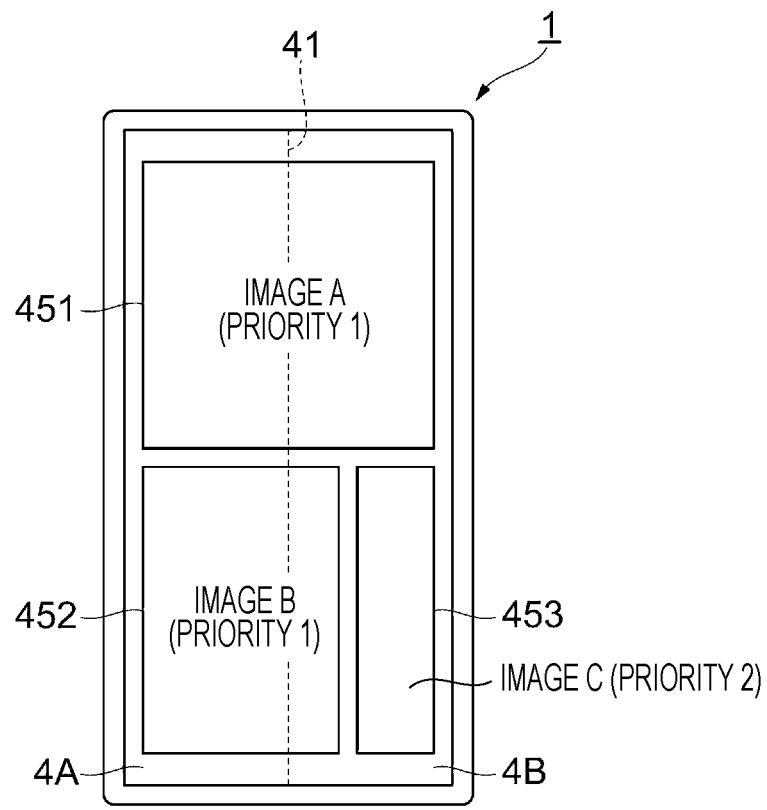
FIGS. 12A and 12B are views explaining Layout Example 7 of images in the case of changing a state of use of the display of the mobile terminal in the portrait orientation to a state of use in the landscape orientation.
Figure 12B:
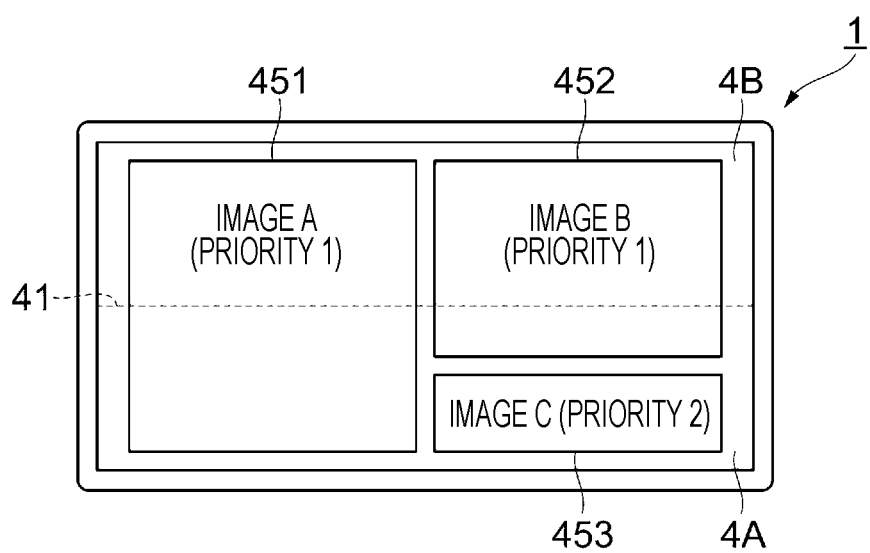

FIGS. 12A and 12B are views explaining Layout Example 7 of images in the case of changing a state of use of the display 4 of the mobile terminal 1 in the portrait orientation to a state of use in the landscape orientation. FIG. 12A illustrates an example of laying out the images in the use of the display 4 in the portrait orientation. FIG. 12B is a view explaining an example of laying out the images in the use of the display 4 in the landscape orientation.

The layout examples illustrated in FIGS. 12A and 12B assume that two images of an image 451 and an image 452 have the priority "1" and an image 453 has the priority "2".

In this exemplary embodiment, regardless of whether the used orientation of the mobile terminal 1 is the portrait orientation or the landscape orientation, the layout of images is decided in order of priority, and an image having lower priority is disposed in an unoccupied area. Accordingly, even if the used orientation is changed, the image 451 and the image 452 are disposed to extend across the boundary 41. The image sizes are not largely changed, and thus a good visibility is ensured.

Exemplary Embodiment 2

Figure 13:
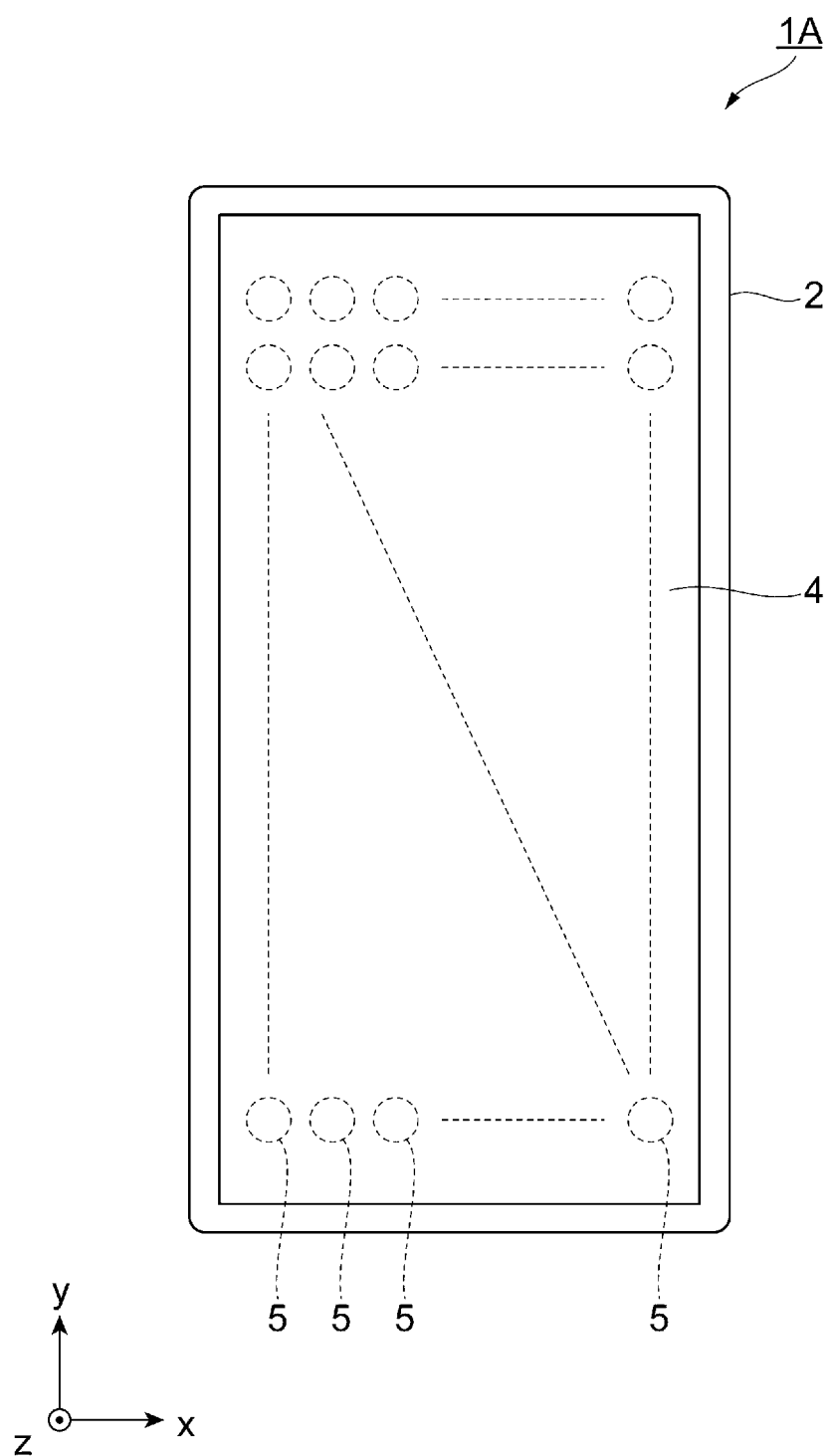
FIG. 13 is a view explaining an example of installing strain gauges in a mobile terminal used in Exemplary Embodiment 2.

FIG. 13 is a view explaining an example of installing strain gauges 5 in a mobile terminal 1A used in Exemplary Embodiment 2.

FIG. 13 is a front view of the mobile terminal 1A.

The body 2 and the display 4 of the mobile terminal 1A used in this exemplary embodiment include a flexible substrate and are foldable and deformable frontward and backward. That is, the display surface of the mobile terminal 1A used in this exemplary embodiment is deformable at any position, unlike the mobile terminal 1 (see FIGS. 1A and 1B) described for Exemplary Embodiment 1. Accordingly, the mobile terminal 1A used in this exemplary embodiment is not provided with the hinge 3.

Instead, the strain gauges 5 are disposed all over the display 4. In FIG. 13, the strain gauges 5 are disposed at a regular pitch all over the display 4. However, the strain gauges 5 may be disposed only in a frame-like peripheral area of the display 4. In this exemplary embodiment, the distribution of the magnitudes of strain output from the strain gauges 5 is used to estimate the shape of the folded and deformed display 4.

The strain gauges 5 are disposed between the lower layer of the display 4 and the body 2. In this exemplary embodiment, the strain gauges 5 are used to decide the position of the boundary 41 resulting from the folding and deformation.

The mobile terminal 1A in this exemplary embodiment is also an example of the information processing apparatus.

Figure 14:
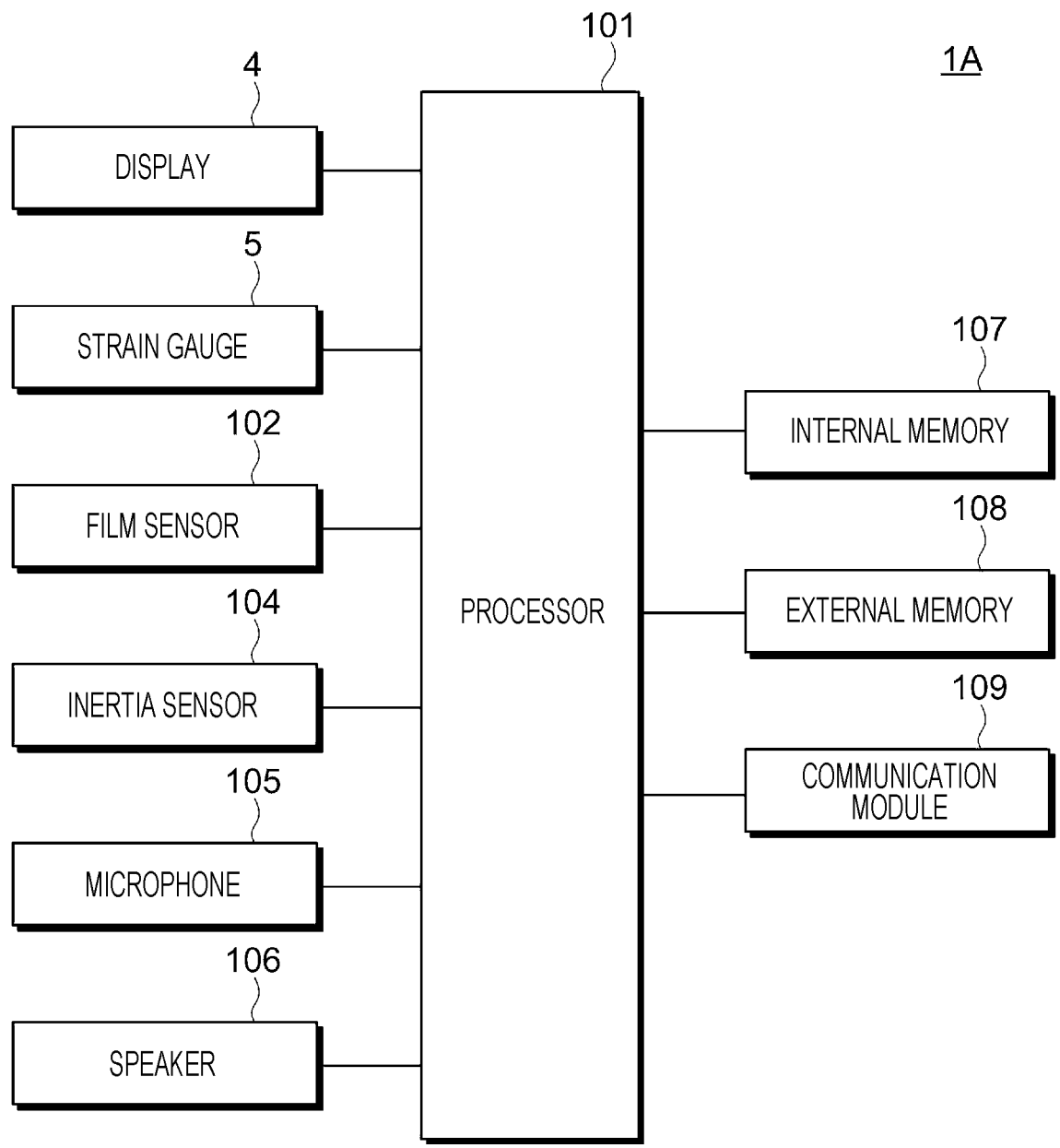
FIG. 14 is a view explaining an example hardware configuration of the mobile terminal used in Exemplary Embodiment 2.

FIG. 14 is a view explaining an example hardware configuration of the mobile terminal 1A used in Exemplary Embodiment 2. Components in FIG. 14 are denoted by references corresponding to those in FIG. 3.

The mobile terminal 1A used in this exemplary embodiment includes the strain gauges 5 instead of the hinge angle sensor 103 (see FIG. 3).

The strain gauges 5 have a structure in which a metal register laid out zigzag is mounted on a thin insulator. The strain gauges 5 measure electrical resistance change accompanying the deformation of the register and convert the electrical resistance change to an amount of strain of the measured object. Each strain gauge 5 is an example of a dynamic sensor.

The processor 101 in this exemplary embodiment estimates the shape of the folded and deformed display 4 on the basis of the distribution of the magnitudes or the like of strain output from the strain gauges 5 and identifies the position of the boundary 41 (see FIGS. 2A and 2B). After identifying the position of the boundary 41, the processor 101 identifies adjacent areas located across the boundary 41 as the display areas 4A and 4B described above in the exemplary embodiment.

Figure 15A:
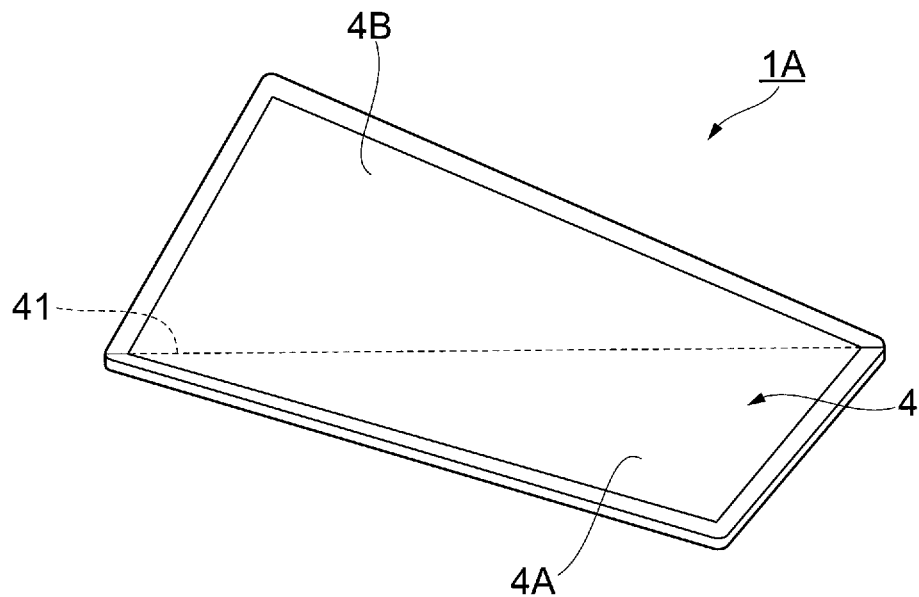
FIGS. 15A and 15B are views explaining a relationship between the deformed display and the boundary in Exemplary Embodiment 2.
Figure 15B:
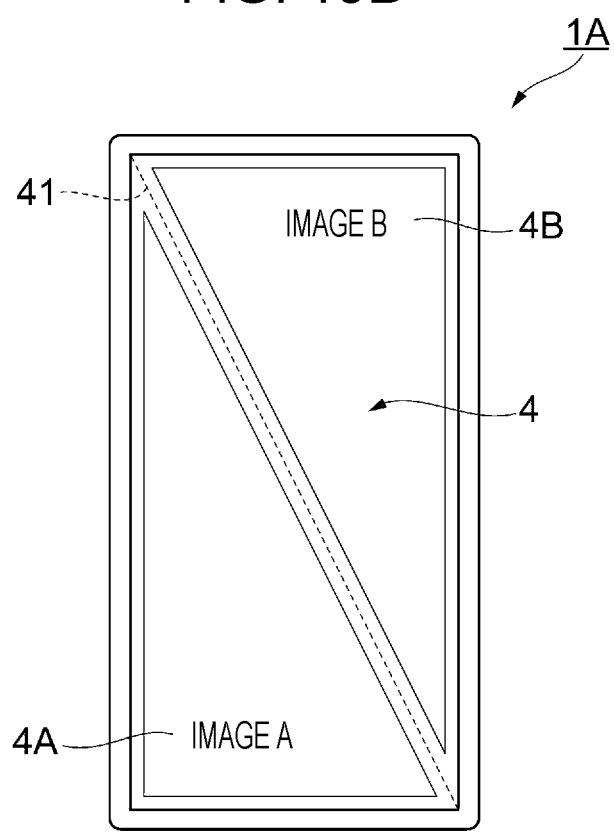

FIGS. 15A and 15B are views explaining a relationship between the deformed display 4 and the boundary 41 in Exemplary Embodiment 2. FIG. 15A illustrates a state where the mobile terminal 1A is deformed along a diagonal of the display 4. FIG. 15B illustrates an example of setting the display areas 4A and 4B after the deformation.

The deformation illustrated in FIGS. 15A and 15B causes the boundary 41 to be formed diagonally on the display 4. This results in the display areas 4A and 4B of a triangle shape.

Figure 16A:
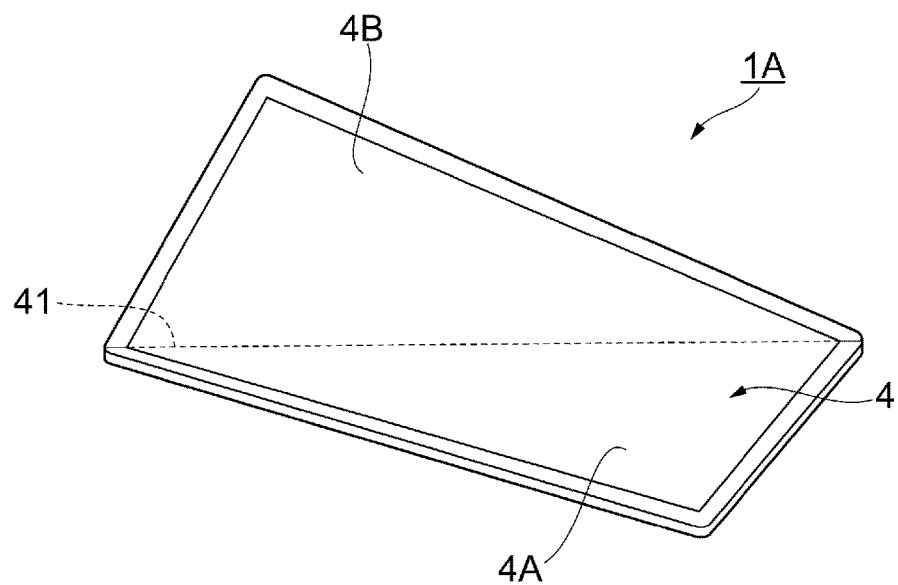
FIGS. 16A to 16C are views explaining relationships between the deformed display and the layout of the images in Exemplary Embodiment 2.
Figure 16B:
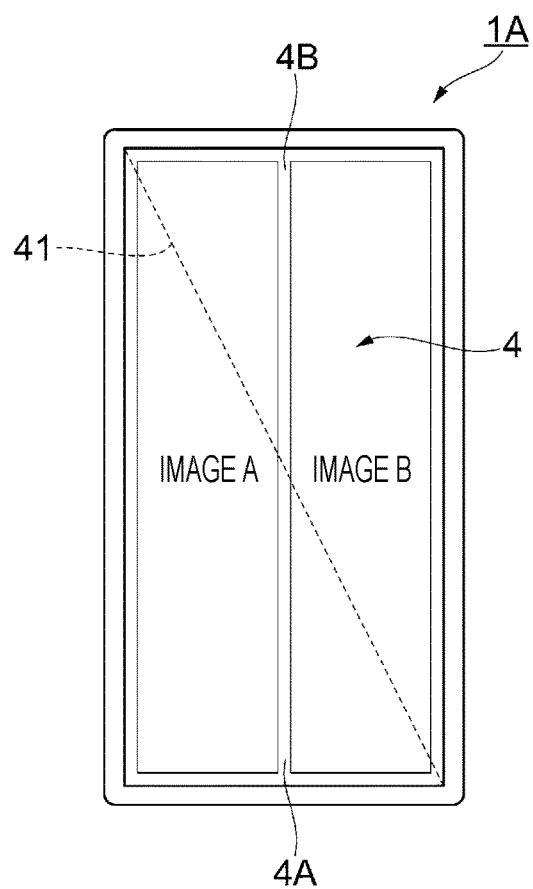
Figure 16C:
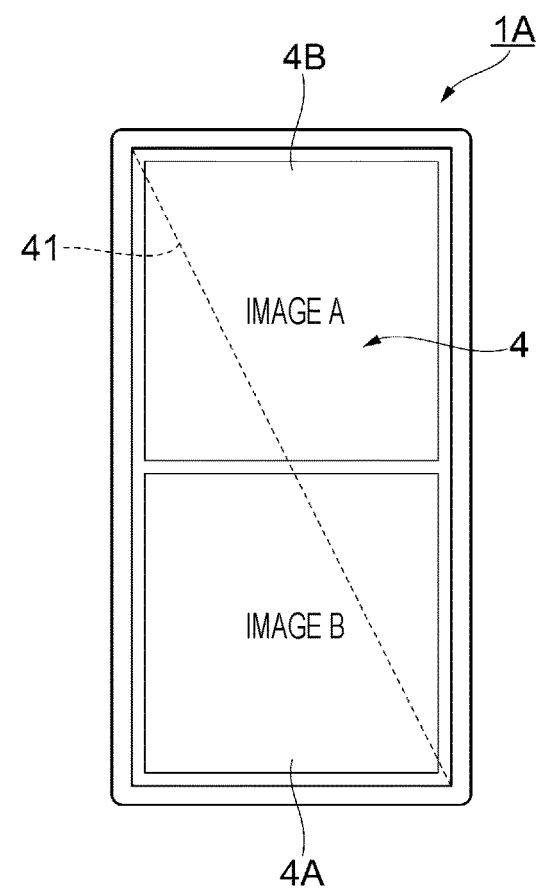

FIGS. 16A to 16C are views explaining relationships between the deformed display 4 and the layout of the images in Exemplary Embodiment 2. FIG. 16A illustrates a state where the mobile terminal 1A is deformed along a diagonal of the display 4. FIG. 16B illustrates a layout example of displaying portrait images A and B. FIG. 16C illustrates a layout example of displaying landscape images A and B. Components in FIGS. 16A to 16C are denoted by references corresponding to those in FIGS. 15A and 15B.

In the mobile terminal 1A used in this exemplary embodiment, the position of the boundary 41 formed on the display 4 is not fixed and varies depending on the folding position. Accordingly, the display areas 4A and 4B have various shapes. If images are displayed in accordance with the shape of the display areas 4A and 4B, the aspect ratios of the images are changed, and the images have lower visibility. In addition, the images are likely to become smaller than before.

However, this exemplary embodiment enables the images to be laid out to extend in the display areas 4A and 4B. Accordingly, if the images A and B are portrait images, it is possible to display the images A and B without changing the portrait aspect ratio by utilizing the size of the display 4 as illustrated in FIG. 16B. If the images A and B are landscape images, it is possible to display the images A and B without changing the landscape aspect ratio by utilizing the size of the display 4 as illustrated in FIG. 16C.

Exemplary Embodiment 3

The case where there is one boundary 41 (see FIGS. 2A and 2B) has heretofore been described in the exemplary embodiments above; however, two or more boundaries 41 may be provided.

Figure 17A:
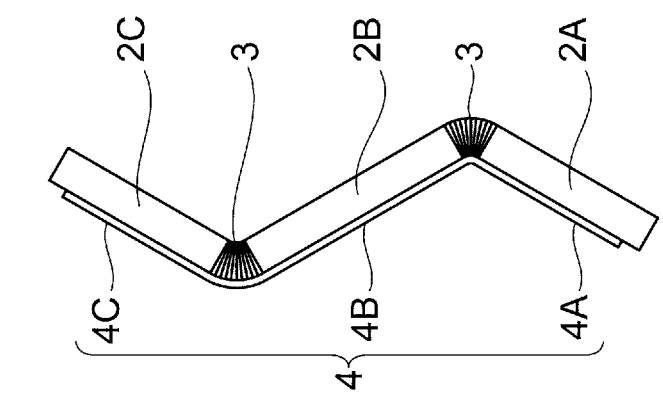
FIGS. 17A to 17C are views explaining an example configuration of a mobile terminal having two hinges.
Figure 17B:
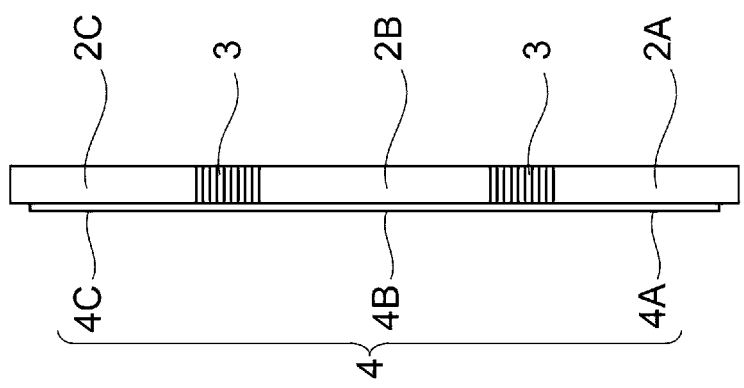
Figure 17C:
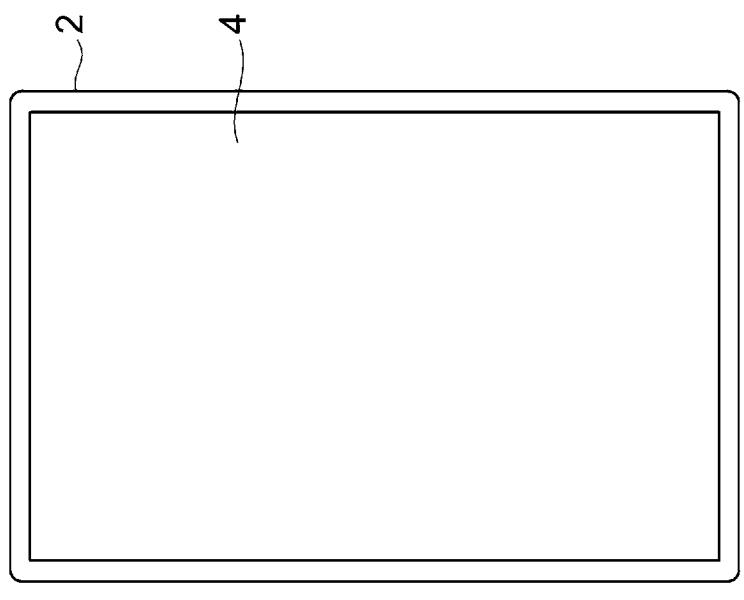

FIGS. 17A to 17C are views explaining an example configuration of a mobile terminal 1B having two hinges 3.

FIGS. 17A and 17B are respectively a front view and a side view of the mobile terminal 1B, and FIG. 17C is a view explaining an example of the deformation of the mobile terminal 1B.

Unlike Exemplary Embodiment 1, each hinge 3 used in this exemplary embodiment enables the surface on the display 4 side to be deformed to have a mountain ridge and a valley.

The mobile terminal 1B illustrated in FIGS. 17A to 17C includes three body panels 2A, 2B, and 2C which are coupled by using the two hinges 3. When the mobile terminal 1B is deformed, two boundaries 41 (see FIGS. 2A and 2B) appear, and the mobile terminal 1B has three divided display areas 4A, 4B, and 4C.

Figure 18A:
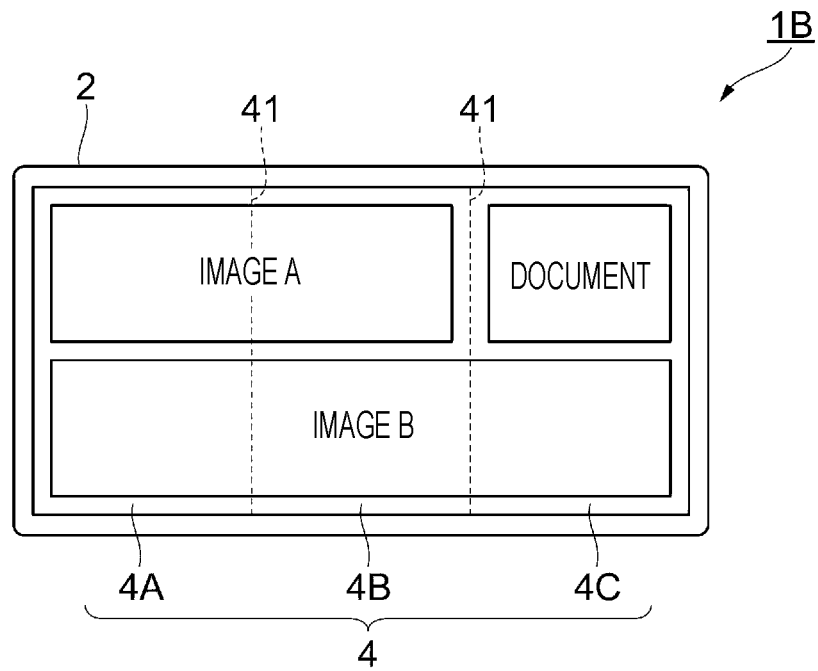
FIGS. 18A and 18B are views explaining an example of laying out images in three display areas.
Figure 18B:
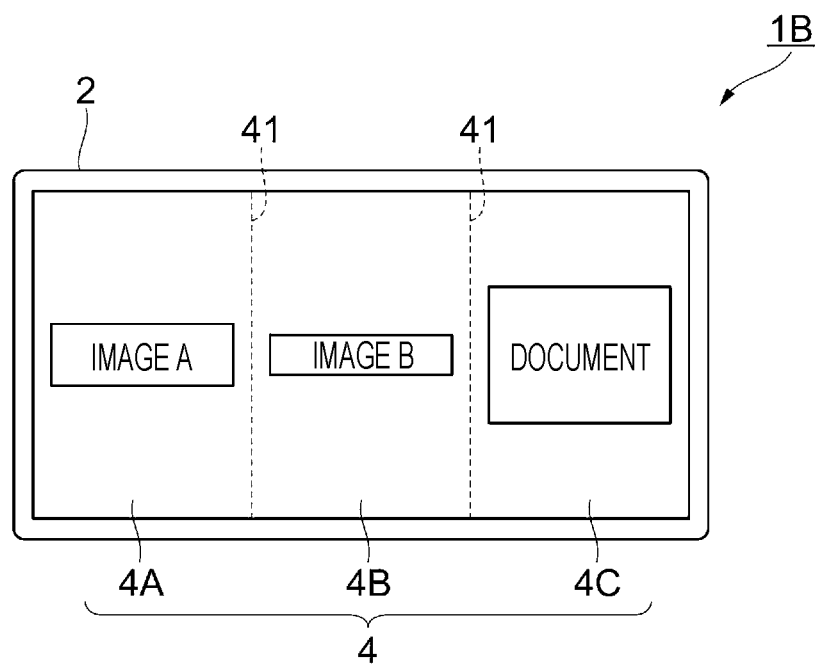

FIGS. 18A and 18B are views explaining an example of laying out images in the three display areas 4A, 4B, and 4C. FIG. 18A illustrates an example of laying out the images extending in two or three display areas. FIG. 18B illustrates a comparative example in which the images are laid out in the respective display areas.

In this exemplary embodiment, an image A, an image B, and a document each have the priority "1". The layout is decided in the order of the image B, the image A, and the document on the basis of an image size and a data amount. Accordingly, the image B having the largest size and data amount is disposed in the lower part of the display 4 to extend in the three display areas 4A, 4B, and 4C. The image A having the second largest size and data amount is disposed in the upper part of the display 4 to extend in the two display areas 4A and 4B. The document is disposed in the unoccupied area located in the upper right part of the display 4.

In the comparative example, the width of each of the images A and B and the document is limited to the width of a corresponding one of the display areas, and the aspect ratio thereof is kept. The images A and B are thus displayed in a smaller size and have lower visibility.

Other Exemplary Embodiments

The exemplary embodiments of the present disclosure have heretofore been described. However, the technical scope of the disclosure is not limited to the scope of the exemplary embodiments. From the description of the scope of claims, it is apparent that the technical scope of the disclosure includes various modifications and improvements made to the exemplary embodiment.

(1) The case where the display 4 (see FIGS. 1A and 1B) of the mobile terminal 1 (see FIGS. 1A and 1B) or the like is exposed to the outside at any time has heretofore been described in the exemplary embodiments above. However, the display 4 may have a structure in which the display 4 is drawn out only for use and accommodated in a housing when not in use.

Figure 19:
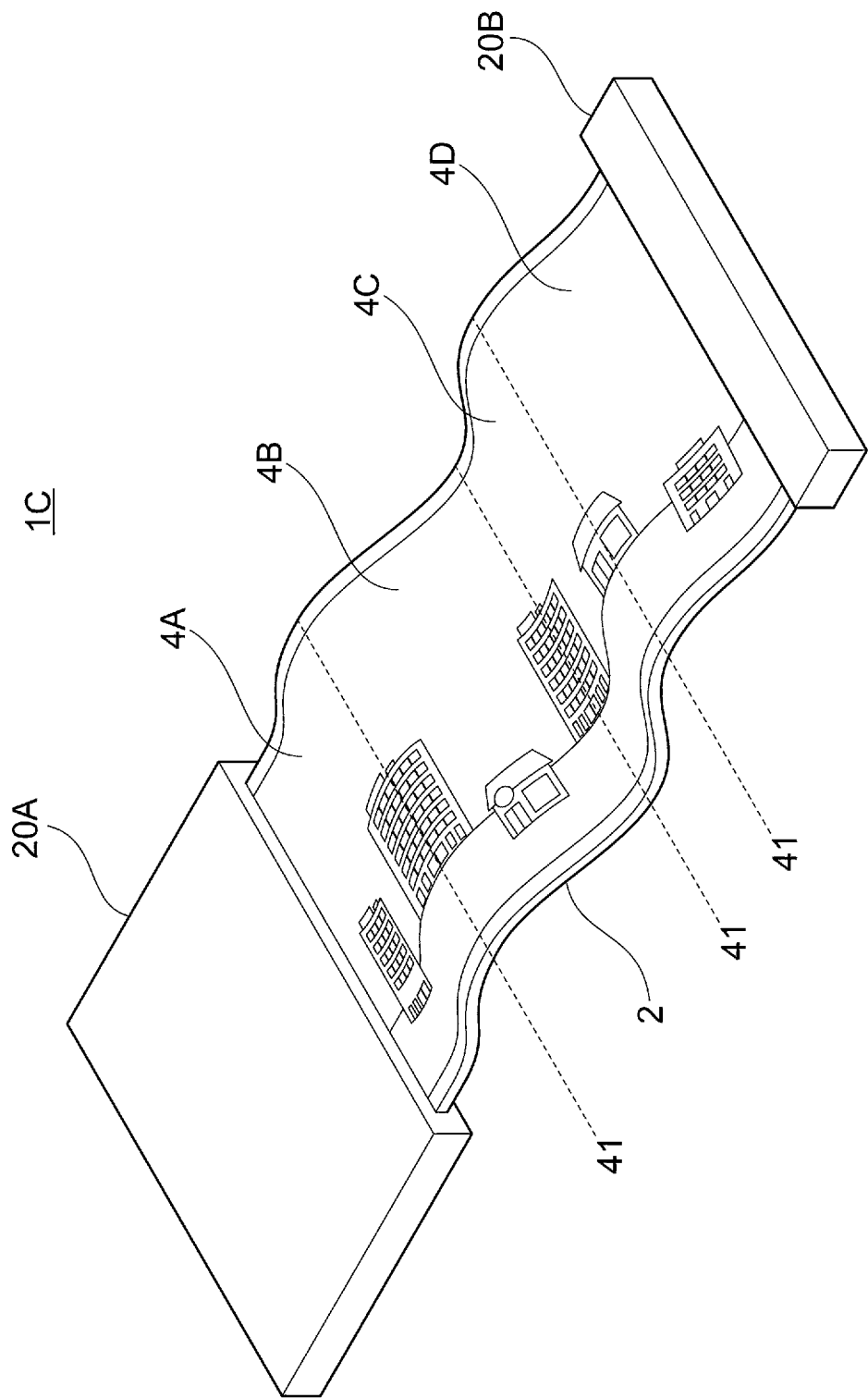
FIG. 19 is a view explaining an example exterior configuration of a different mobile terminal.

FIG. 19 is a view explaining an example exterior configuration of a different mobile terminal 1C. The mobile terminal 1C is also an example of the information processing apparatus.

The mobile terminal 1C illustrated in FIG. 19 includes an apparatus body 20A and a drawing member 20B. The apparatus body 20A accommodates a wound film body 2. The body 2 includes a display 4 having a deformable display surface. The drawing member 20B is installed on an opposite side of the body 2 from the apparatus body 20A.

In FIG. 19, the display 4 drawn out from the apparatus body 20A cockles due to the deformation and thus is provided with three boundaries 41. In this case, images may be laid out to extend in two or four of four display areas 4A to 4D defined by the three boundaries 41. Although the three boundaries 41 are formed in FIG. 19, it is possible that no boundary 41, only one boundary 41, two boundaries 41, or four or more boundaries 41 are formed.

(2) The case where the mobile terminal 1 (see FIGS. 1A and 1B) or the like includes one deformable display 4 (see FIGS. 1A and 1B) has heretofore been described in Exemplary Embodiment 1 above. However, multiple displays 4 may be provided.

Figures 20A, 20B:
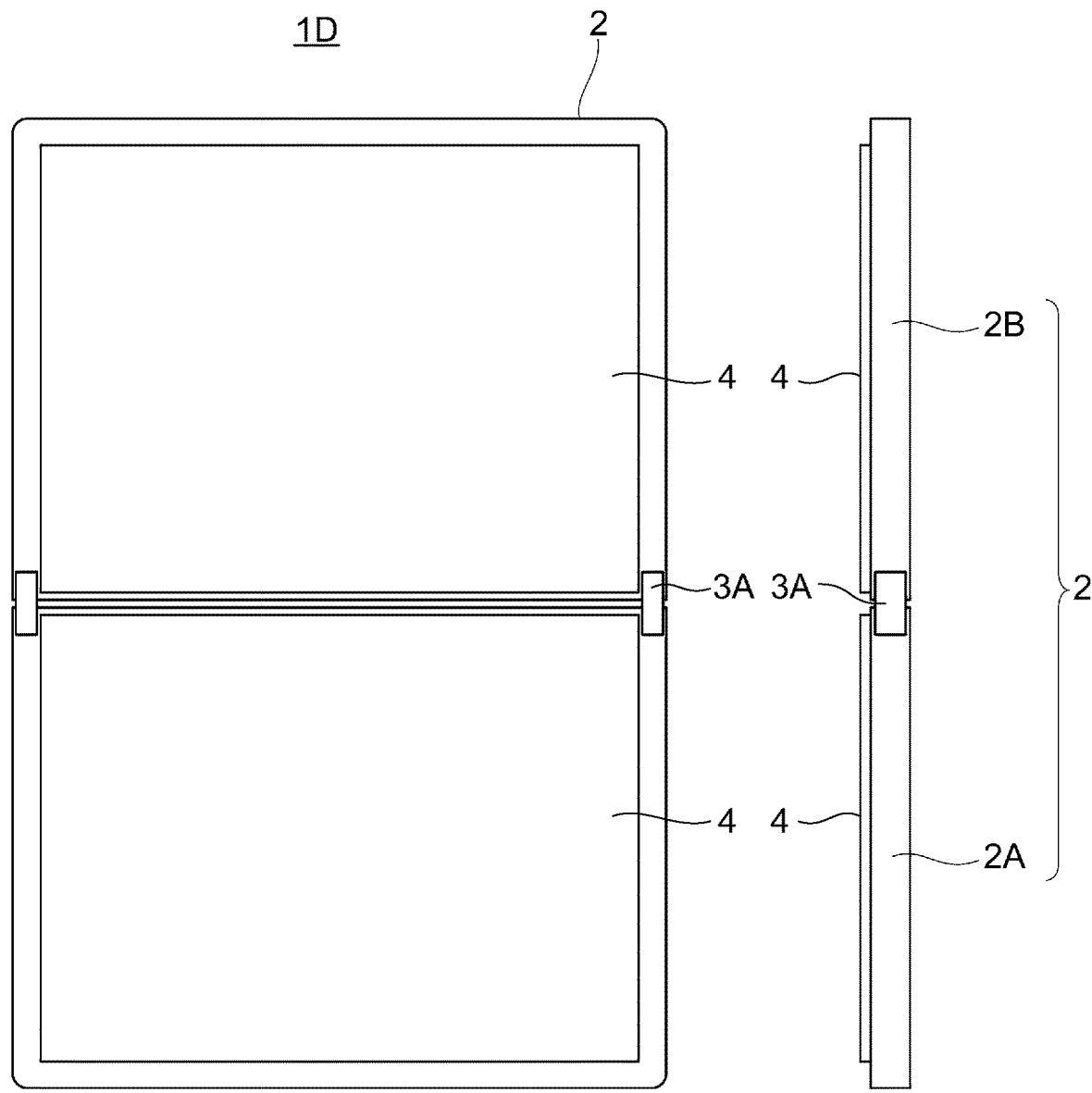
FIGS. 20A and 20B are views explaining an example exterior configuration of a different mobile terminal and are respectively a front view and a side view of the mobile terminal.

FIGS. 20A and 20B are views explaining an example exterior configuration of a different mobile terminal 1D and are respectively a front view and a side view of the mobile terminal 1D. Components in FIGS. 20A and 20B are denoted by references corresponding to those in FIGS. 1A and 1B. The mobile terminal 1D is also an example of the information processing apparatus.

The mobile terminal 1D illustrated in FIGS. 20A and 20B has a display surface composed of the two displays 4. The two displays 4 have respective display areas independent from each other. Images for respective apps may be displayed in only one display area or to extend on the two displays 4.

In the mobile terminal 1D, the body panels 2A and 2B are attached to a hinge 3A to be rotatable in two directions. The hinge 3A internally has rotary shafts for respectively attaching the body panel 2A and the body panel 2B to be freely rotatable in the two directions. This enables the mobile terminal 1D to be folded with the displays 4 facing each other or in opposite directions.

The body panel 2A, the body panel 2B, and the displays 4 that are used in this exemplary embodiment are each highly rigid and are not deformed themselves.

(3) The case where the length Ly of each long side of the display 4 in the exemplary embodiments above is twice or more as long as the length Lx of the short side has heretofore been described; however, the length Ly of the long side may be twice or less as long as the short side of the length Lx.

(4) Each exemplary embodiment above assumes that the display 4 has a rectangular shape; however, the rectangular shape may have at least one of the four corners chamfered or rounded. Examples of the shape include a rectangle with all the four corners rounded.

The shape of the display 4 is not limited to the rectangle and may be, for example, a polygon or a closed curve shape. The polygon is not limited to an equilateral polygon and may be a convex polygon. The closed curve shape may be an oval, a circle, or a heart.

(5) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
in response to dividing an area of a display surface of a deformable display into a plurality of areas with a folded portion located as a boundary between the plurality of areas as a result of deformation of the deformable display, decide a layout of a plurality of images to be displayed in the area of the display surface, the layout being decided based on information regarding each of the plurality of images; and
decide an assignment of an area for an image having a plurality of pages among the plurality of images in the area of the display surface, the assignment being decided based on a direction of scrolling to change a page.

2. An information processing apparatus comprising:
a processor configured to:
in response to dividing an area of a display surface of a deformable display into a plurality of areas with a folded portion located as a boundary between the plurality of areas as a result of deformation of the deformable display, decide a layout of a plurality of images to be displayed in the area of the display surface, the layout being decided based on information regarding each of the plurality of images; and
assign an area extending horizontally in the area of the display surface to an image having a screen ratio of landscape and having a priority higher than a priority of one or more remaining images among the plurality of images and respectively assign one or more remaining areas in the area of the display surface to the one or more remaining images in priority order.

3. An information processing apparatus comprising:
a processor configured to:
in response to dividing an area of a display surface of a deformable display into a plurality of areas with a folded portion located as a boundary between the plurality of areas as a result of deformation of the deformable display, decide a layout of a plurality of images to be displayed in the area of the display surface, the layout being decided based on information regarding each of the plurality of images; and
assign an area extending vertically in the area of the display surface to an image having a screen ratio of portrait and having a priority higher than a priority of one or more remaining images among the plurality of images and respectively assign one or more remaining areas in the area of the display surface to the one or more remaining images in priority order.

4. The information processing apparatus according to claim 2,
wherein the priority of each image is based on a user setting.

5. The information processing apparatus according to claim 3,
wherein the priority of each image is based on a user setting.

6. The information processing apparatus according to claim 2, wherein a priority of a moving image, a still image, and a document is set higher than a priority of a memo, an operator, and a widget.

7. The information processing apparatus according to claim 3,
wherein a priority of a moving image, a still image, and a document is set higher than a priority of a memo, an operator, and a widget.

8. The information processing apparatus according to claim 2,
wherein the priority of each image is decided on a basis of an amount of data of the image.

9. The information processing apparatus according to claim 3,
wherein the priority of each image is decided on a basis of an amount of data of the image.

10. A non-transitory computer readable medium storing a program causing a computer to execute a process comprising:
in response to dividing an area of a display surface of a deformable display into a plurality of areas with a folded portion located as a boundary between the plurality of areas as a result of deformation of the deformable display, deciding a layout of a plurality of images to be displayed in the area of the display surface, the layout being decided on a basis of information regarding each of the plurality of images; and
deciding an assignment of an area for an image having a plurality of pages among the plurality of images in the area of the display surface, the assignment being decided based on a direction of scrolling to change a page.

11. An information processing apparatus comprising:
means for, in response to dividing an area of a display surface of a deformable display into a plurality of areas with a folded portion located as a boundary between the plurality of areas as a result of deformation of the deformable display, deciding a layout of a plurality of images to be displayed in the area of the display surface, the layout being decided on a basis of information regarding each of the plurality of images; and
means for deciding an assignment of an area for an image having a plurality of pages among the plurality of images in the area of the display surface, the assignment being decided based on a direction of scrolling to change a page.

* * * * *